US008034253B2

(12) United States Patent
Monzyk et al.

(10) Patent No.: US 8,034,253 B2
(45) Date of Patent: Oct. 11, 2011

(54) DECONTAMINANT

(75) Inventors: Bruce F. Monzyk, Jerome Township, OH (US); Russell R. Greene, West Jefferson, OH (US); Chad M. Cucksey, Columbus, OH (US); John A. McArthur, Westerville, OH (US); F. Michael Von Fahnestock, Columbus, OH (US); Steven C. Lorence, Liberty Township, OH (US); Michael J. Murphy, Dublin, OH (US); Brian J. Blackstone, Pickerington, OH (US); Thomas A. Malloy, IV, Worthington, OH (US)

(73) Assignee: Battelle Memorial Insitute, Columbus, OH (US)

( * ) Notice: Subject to any disclaimer, the term of this patent is extended or adjusted under 35 U.S.C. 154(b) by 555 days.

(21) Appl. No.: 11/718,851

(22) PCT Filed: Nov. 14, 2005

(86) PCT No.: PCT/US2005/041714
§ 371 (c)(1),
(2), (4) Date: Feb. 4, 2009

(87) PCT Pub. No.: WO2007/075153
PCT Pub. Date: Jul. 5, 2007

(65) Prior Publication Data

US 2009/0216060 A1 Aug. 27, 2009

Related U.S. Application Data

(60) Provisional application No. 60/627,409, filed on Nov. 12, 2004.

(51) Int. Cl.

| | |
|---|---|
| ***C09K 3/00*** | (2006.01) |
| ***A62D 3/00*** | (2007.01) |
| ***A62D 9/00*** | (2006.01) |
| ***A62D 3/30*** | (2007.01) |
| ***A62D 3/38*** | (2007.01) |
| ***C01B 7/00*** | (2006.01) |
| ***C01B 11/00*** | (2006.01) |
| ***C01B 13/00*** | (2006.01) |
| ***C01B 15/00*** | (2006.01) |
| ***C11D 3/39*** | (2006.01) |
| ***C02F 1/00*** | (2006.01) |
| ***C01C 1/00*** | (2006.01) |
| ***C01G 49/00*** | (2006.01) |
| ***C01G 49/02*** | (2006.01) |

(52) U.S. Cl. .......... 252/182.11; 252/186.25; 252/186.1; 588/313; 588/320; 588/405; 423/594.1; 423/632

(58) Field of Classification Search .......... 588/313–320, 588/401–415; 252/182.12, 182.11, 183.32, 252/182.33, 186.1, 186.25; 423/594.1, 594.2, 423/594.15, 594.16, 632
See application file for complete search history.

(56) References Cited

U.S. PATENT DOCUMENTS 3,372,125 A 3/1968 Hill
(Continued)

FOREIGN PATENT DOCUMENTS

CN 1524595 9/2004
(Continued)

OTHER PUBLICATIONS

Dean, John A. "Lange's Handbook of Chemistry", 15th edition, 1999, McGraw-Hill, New York, 8.104-8.111.*
(Continued)

*Primary Examiner* — Stanley Silverman
*Assistant Examiner* — Anthony J Zimmer
(74) *Attorney, Agent, or Firm* — Klaus Wiesmann; Yimei C. Hammond

(57) ABSTRACT

Method and composition for decomposing and detoxifying chemical warfare agents, organic toxic compounds (e.g., pesticides), and for removal of contaminants in materials including fuels. The method and composition are based on ferrate (VI). The ferrate is typically applied to a contaminated surface or volume with a phase transfer catalyst and/or with a carrier.

19 Claims, 5 Drawing Sheets

U.S. PATENT DOCUMENTS

| | | | |
|---|---|---|---|
| 3,904,421 A | 9/1975 | Shimizu et al. | |
| 4,156,613 A | 5/1979 | Hund | |
| 4,225,352 A | 9/1980 | Makino et al. | |
| 4,243,494 A | 1/1981 | Riggs, Jr. et al. | |
| 4,256,551 A | 3/1981 | Cliff et al. | |
| 4,606,843 A | 8/1986 | Kaczur | |
| 4,705,726 A | 11/1987 | Shindou et al. | |
| 5,284,642 A | 2/1994 | Evrard et al. | |
| 5,416,150 A | 5/1995 | Boeck | |
| 5,607,504 A | 3/1997 | Schmid et al. | |
| 6,080,288 A | 6/2000 | Schwartz et al. | |
| 6,267,896 B1 | 7/2001 | Patterson et al. | |
| 6,471,788 B1 | 10/2002 | Minevski et al. | |
| 6,566,574 B1 * | 5/2003 | Tadros et al. | 252/186.41 |
| 6,576,346 B1 | 6/2003 | Ravenscroft et al. | |
| 6,723,890 B2 * | 4/2004 | Tucker et al. | 588/318 |
| 6,837,984 B2 | 1/2005 | Wang et al. | |
| 6,899,769 B2 | 5/2005 | Ravenscroft et al. | |
| 6,899,956 B2 | 5/2005 | Block et al. | |
| 7,045,024 B2 | 5/2006 | Minevski et al. | |
| 7,045,051 B2 | 5/2006 | Minevski et al. | |
| 7,291,217 B2 | 11/2007 | Phelps et al. | |
| 7,347,893 B2 | 3/2008 | Low | |
| 7,387,671 B2 | 6/2008 | Meisen et al. | |
| 7,387,672 B2 | 6/2008 | Friedrich | |
| 7,410,536 B2 | 8/2008 | Friedrich et al. | |
| 7,422,793 B2 | 9/2008 | Phelps et al. | |
| 2002/0098989 A1 | 7/2002 | Heimann et al. | |
| 2003/0042134 A1 | 3/2003 | Tremblay et al. | |
| 2003/0055245 A1 | 3/2003 | Tseng et al. | |
| 2003/0146169 A1 | 8/2003 | Ciampi et al. | |
| 2003/0159942 A1 | 8/2003 | Minevski et al. | |
| 2004/0104377 A1 | 6/2004 | Phelps et al. | |
| 2004/0216637 A1 | 11/2004 | Buchheit et al. | |
| 2005/0022810 A1 | 2/2005 | Moore et al. | |
| 2005/0049157 A1 | 3/2005 | MacDonald et al. | |
| 2005/0053543 A1 | 3/2005 | Kneip et al. | |
| 2005/0123743 A1 | 6/2005 | Martinazzo | |
| 2005/0152828 A1 | 7/2005 | Aga et al. | |
| 2006/0134339 A1 | 6/2006 | Wang et al. | |
| 2006/0162613 A1 | 7/2006 | Rosenhahn et al. | |
| 2008/0305341 A1 | 12/2008 | Plieth et al. | |
| 2009/0216060 A1 | 8/2009 | Monzyk et al. | |
| 2011/0017209 A1 | 1/2011 | Monzyk et al. | |

FOREIGN PATENT DOCUMENTS

| | | |
|---|---|---|
| DE | 553004 | 5/1943 |
| EP | 166825 | 1/2002 |
| FR | 2805162 | 8/2001 |
| JP | 59139314 | 8/1984 |
| JP | 61053398 | 3/1986 |
| JP | 62007596 | 1/1987 |
| JP | 62007596 A * | 1/1987 |
| JP | 62091225 | 4/1987 |
| JP | 62292492 | 12/1987 |
| JP | 62292492 A * | 12/1987 |
| WO | 0121856 | 3/2001 |
| WO | 0182896 | 11/2001 |
| WO | 2005069892 | 8/2005 |
| WO | 2006015756 | 2/2006 |
| WO | 2007075153 | 7/2007 |
| WO | 2008112657 | 9/2008 |
| WO | 2009142823 | 11/2009 |
| WO | 2010045657 | 4/2010 |

OTHER PUBLICATIONS

Kim et al., "Selective Oxidation of Allylic and Benzylic Alcohols Using Potassium Ferrate under Phase-Transfer Catalysis Condition", Synthesis vol. 10, 1984, 866-868.*

Sharma, Virender K., "Potassium ferrate (VI): and environmentally friendly oxidant", Advances in Environmental Research 6 (2002) 143-156.*

Audette, R.J., Quail, J.W.: "Potassium, Rubidium, Cesium, and Barium Ferrates(VI). Preparations, Infrared Spectra, and Magnetic Susceptibilities". Inorganic Chemistry, [Online], vol. 11, No. 8, Aug. 1972, XP002569971 DOI: 10.1021/ic50114a034 [retrieved on Feb. 23, 2010].

Bouzek, K., Lipovska, M., Schmidt, M., Rousar, I., Wragg, A.A.: "Electrochemical Production of Ferrate(VI) Using Sinusoidal Alternating Current Superimposed on Direct Current: Grey and White Cast Iron Electrodes". Electrochimica Acta, vol. 44 (1998) pp. 547-557.

Bouzek, K., Rousar, I.: "The Study of Electrochemical Preparation of Ferrate(VI) Using Alternating Current Superimposed on the Direct Current Frequency Dependence of Current Yields". Electrochimica Acta, vol. 38, No. 13, 1993, pp. 1717-1720.

Bouzek, K., Flower, L., Rousar, I., Wragg, A.A.: "Electrochemical Production of Ferrate(VI) Using Sinusoidal Alternating Current Superimposed on Direct Current. Pure Iron Electrode". Journal of Applied Electrochemistry, vol. 29, 1999, pp. 569-576.

Bouzek, K., et al. "Influence of Anode Material on Current Yields During Ferrate(VI) Production by Anodic Iron Dissolution Part I: Current Efficiency During Anodic Dissolution of Grey Cast Iron to Ferrate(VI) in Concentrated Alkali Hydroxide Solutions". Journal of Applied Electrochemistry, vol. 26, 1996, pp. 919-923.

Dean, John A. "Lange's Handbook of Chemistry". 15th edition, 1999, McGraw-Hill, New York, 8.104-8.111.

Delaude et al.: "A Novel Oxidizing Reagent Based on Potassium Ferrate(VI)". Journal of Organic Chemistry, vol. 61, 1996, pp. 6360-6370.

Grube, Von G., Gmelin, H.: "Effects of Superimposed Alternating Current on Anode Ferrate Formation". Zeitschrift fur Electrochemie, vol. 26, 1920, pp. 153-161.

He, W., Wang, J., Yang, C., and Zhang, J.: "The Rapid Electrochemical Preparation of Dissolved Ferrate(VI): Effects of Various Operating Parameters". Electrochimica Acta, vol. 51, 2006, pp. 1067-1973.

Hirota, N.: "Anticorrosion Paints". May 12, 1984, XP002569967, database accession No. 1972:476784.

Hives, J., Benova, M., Bouzek, K., Sitek, J., Sharma, V.K.: "The Cyclic Voltammetric Study of Ferrate(VI) Formation in a Molten Na/K hydroxide Mixture". Electrochimica Acta, vol. 54, 2008, pp. 203-208.

Kim, K.S., Chang, Y., Bae, S.K. and Hahn, C.S.: "Selective Oxidation of Allylic and Benzylic Alcohols Using Potassium Ferrate under Phase-Transfer Catalysis Condition". Synthesis, vol. 10, Oct. 1984, pp. 866-868. XP002438865.

Licht, Stuart, Naschitz, Vera, Wang, Baohui: "Rapid Chemical Synthesis of the Barium Ferrate Super-Iron Fe (VI) Compound, BaFeO4". Journal of Power Sources [Online] vol. 109, Jun. 15, 2002, pp. 67-70, XP002569968 DOI: doi:10.1016/S0378-7753(02)00041-1 [retrieved on Feb. 23, 2010].

Macova, Z., Bouzek, K, Hives, J., Sharma, V.K., Terryn, R.J., Baum, J.C.: "Research Progress in the Electrochemical Synthesis of Ferrate(VI)". Electrochimica Acta, vol. 54, 2009, pp. 2673-2683.

Sharma, Virender K., "Potassium Ferrate(VI): An Environmentally Friendly Oxidant". Advances in Environmental Research 6 (2002) 143-156.

Yang, W., Zhou, Y., Wang, H. and Bi, D.: "Studies on Influence of Various Experimental Conditions on Electrochemical Generation of Ferrate(VI) in NaOH-KOH mixed Electrolyte". Russian Journal of Electrochemistry, vol. 45, No. 7, 2009, pp. 795-799.

First Report mailed May 29, 2009, from Australian Intellectual Property Office, in an Australian patent No. 2005206927.

Notice of Allowance mailed Jun. 4, 2010, from Australian Intellectual Property Office, in an Australian patent No. 2005206927.

The First Office Action from The State Intellectual Property Office of the People's Replublic of China mailed on Mar. 10, 2010, in the Chinese patent application No. 200580002471.5.

The Second Office Action from the State Intellectual Property Office of the People's Republic of China mailed on Nov. 4, 2010, in the Chinese patent application No. 200580002471.5.

First Office action mailed on Sep. 10, 2010, in a co-pending US patent application publication No. 20090216060 published on Aug. 27, 2009.

Second Office action mailed on Jan. 12, 2011, in a co-pending US patent application publication No. 20090216060 published on Aug. 27, 2009.

Communication from the European Patent Office mailed on Apr. 11, 2008, in a co-pending European Patent Application No. 05858701.5-1218.

Communication from the European Patent Office mailed on Jun. 18, 2010, in a co-pending European Patent Application No. 05858701.5-1218.

Issuance Notice mailed on Nov. 16, 2010, in a co-pending European Patent Application No. 05858701.5-1218.

Written Opinion of the International Searching Authority for International Application Publication No. WO2007/075153 (Application No. PCT/US2005/04714), published on Jul. 5, 2007, Authorized Officer Dalkafouki, A.

International Search Report for International Application Publication No. WO2007/075153 (Application No. PCT/US2005/04714), published on Jul. 5, 2007, Authorized Officer Dalkafouki, A.

Written Opinion of the International Searching Authority for International Application Publication No. WO2008/112657 (Application No. PCT/US2008/056446), published on Sep. 18, 2008, Authorized Officer Pelli Wablat, B.

Written Opinion of the International Searching Authority for International Application Publication No. WO2010/045657 (Application No. PCT/US2009/061204), published on Apr. 22, 2010, Authorized Officer Schmitt, J.

Written Opinion of the International Searching Authority for International Application Publication No. WO2009/142823 (Application No. PCT/US2009/038472), published on Nov. 26, 2009, Authorized Officer Simin Baharlou.

Written Opinion of the International Searching Authority for International Application Publication No. WO2005/069892 (Application No. PCT/US2005/001402), published on Aug. 4, 2005, Authorized Officer Roy King.

* cited by examiner

DECONTAMINANT

This application claims priority to U.S. Provisional Application Ser. No. 60/627,409 filed Nov. 12, 2004. The disclosure of the provisional application is incorporated herein by reference as if completely rewritten herein.

Part of the invention was made with government support under Contract No. W911NF-05-R-0051 awarded by the U.S. Army Research Office and Defense Threat Reduction Agency. The Government has certain rights in this invention.

BACKGROUND OF THE INVENTION

Although water, sunlight, aging, and detergents are useful in certain decontamination activities, these mild reagents are slow to react, do an incomplete job of decontamination, form very stable toxic products (e.g., EA 2192 or N-oxides in the case of VX, or polythiols or thiodiglycol in the case of HD), and can spread toxic chemicals around the cleanup area and cause them to move to other sites such as protective garments, absorbed into materials, onto floors, into sewers, and transported to waste water treatment facilities.

Currently used decontamination reagents include chlorine-based chemicals (e.g., bleach, chlorine dioxide, and high test hypochlorite (HTH)) and caustic chelating amines (e.g., DS2). DF-200, a proprietary blend of organic and inorganic materials developed at Sandia Corporation, is also a current decontamination reagent (Tadros, Maher E. and Mark D. Tucker, Mark D., "Formulations for Neutralization of Chemical and Biological Toxants," U.S. Pat. No. 6,566,574 (2003).). See also U.S. Pat. No. 6,723,890 to Tadros et al. The patents disclose several formulations for neutralizing chemical or biological toxicants. The patents and other publications cited therein provide further background of the state of the art.

SUMMARY OF THE INVENTION

Broadly, one aspect of the invention provides for a decontamination composition including $(R_1R_2R_3R_4N)_2FeO_4$ and a carrier, wherein the quaternary amine is selected from the group $R_1,R_2,R_3,R_4N^+$ where R=alkyl and/or aryl, and wherein the "R" groups can represent cyclic structures, or form cyclic structures with two "R" groups, and where the total carbon number for the compound is at least 4. The carrier is typically a liquid substantially oxidation resistant to ferrate and may be water. In some embodiments $R_1$ and $R_2$, and/or $R_3$ and $R_4$ form an aliphatic ring.

Another embodiment of the invention includes a decontamination composition including a ferrate(VI) compound; and a phase transfer catalyst. In some aspects water and/or buffer may be included. The phase transfer catalyst may be an organic quaternary ammonium or organic phosphonium compound, wherein the organic portion comprises an aliphatic or aryl hydrocarbon compound, or a mixture thereof; having noninterfering functional groups selected from the groups consisting of halides, methoxy (R—O—), olefin, linear or branched.

A further aspect of the invention includes a method for treating a hazardous or toxic material including contacting the material with a ferrate compound(VI), and a phase transfer catalyst, wherein the hazardous or toxic material is rendered less hazardous or toxic. The hazardous or toxic material is typically a chemical warfare agent, a herbicide, or a pesticide. One method may include removing a contaminant from a material by the steps of contacting the material with a ferrate compound(VI), a phase transfer catalyst wherein the material is reduced contaminant content. The material is typically a crude oil, coal, or natural gas or their derivative.

Another aspect of the invention provides for an essentially nonaqueous decontamination formulation for use in simultaneous oxidation, hydrolysis, acid neutralization, and/or precipitation, of organic and/or inorganic compounds, and/or disinfection of biological microorganisms, comprising a ferrate(VI) compound. The formulation typically includes a cationic, oil soluble, oxidation resistant phase transfer compound. The cationic phase transfer compound is typically selected from the group of quaternary amines and/or organic phosphonium compounds. In some embodiments the quaternary amine is N-methyl tri-octyl ammonium ion (e.g. Aliquat® 336). In yet other embodiments, the quaternary amine can be selected from the group $(R_1R_2R_3R_4N)_2FeO_4$ and a carrier, wherein the quaternary amine is selected from the group $R_1,R_2,R_3,R_4N^+$ where R=alkyl and/or aryl, and wherein the "R" groups can represent aliphatic cyclic structures, or form cyclic structures with two "R" groups (there may be two cyclic groups per nitrogen), and where the total carbon number for the compound is at least 4. The quaternary amine may be applied with a solvent substantially oxidation resistant to ferrate. A typical carrier is water. Typically, the quaternary amine is selected from quaternized polyamines, where two of the $R_1$, $R_2$, $R_3$, or $R_4$ groups are polymer chains and where the other two are alkyl and/or aryl, and where these "R" groups can represent cyclic structures. In some embodiments a phosphonium compound is selected from the group $R_1,R_2,R_3,R_4P^+$ where R=alkyl and/or aryl and where the "R" groups can represent cyclic structures, and where the total carbon number for the compound is at least 4. In some applications $R_4$ is a lower alkyl group of 1 to 6 carbons, and $R_1$, $R_2$, $R_3$ are represented by cyclic structures, aryl and/or aromatic such as pyridine, N-alkyl piperidine, N-alkyl pyrrolidine, N,N-dialkylated aniline, N,N'-alkylated piperazine, N-alkyl (1-phenylpiperazine), N,N,N',N'-tetraethyl hexamethylene diamine, N-alkyl morpholine, N-alkyl imidazole, and the like. In yet other embodiments, $R_4$ is methyl, ethyl, isopropyl, t-butyl, i-butyl, or n-butyl, and $R_1$, $R_2$, $R_3$ is represented by cyclic structures, aryl and/or aromatic, such as pyridine, N-alkyl piperidine, N-alkyl pyrrolidine, N,N-dialkylated aniline, N,N'-alkylated piperazine, N-alkyl (1-phenylpiperazine), N,N,N',N'-tetraethyl hexamethylene diamine, N-alkyl morpholine, and the like. Other formulations use an N-alkylated tertiary amine (such as N-methyl derivatives of triethylamine, N-methylpiperidine, trimethylamine, tri(2-propyl) amine, N-methylpyridine, and the like.

Typically the anion of the cationic phase transfer catalyst is selected to be one or a combination of hydroxide ion, sulfate ion, chloride ion, nitrate ion, orthophosphate ion (including any combination of mono-, di- or tri-basic forms), other phosphates, phosphonates, or phosphinates, acetate, any other oxidation resistant carboxylate, including polycarboxylates (such as citrate, succinate, polyacrylate, and the like), sulfonate (such as salts of methane sulfonate ion, benzene sulfonate ion, and the like), hexafluorophosphate, tetraphenyl borate ions, trifluoroborate, including blends and mixtures of these ions, and the like. A pH buffer is typically included as further explained below. Typically, the buffer and amount of buffer is included such that the final pH after reaction of the ferrate is in the range 6-13, or in some embodiments is in the range 7-10.5. The buffer may be orthophosphate (including any combination of mono-, di- or tri-basic forms), other phosphates, phosphonates, or phosphinates, acetate, carbonate, borate, borax, tetraborate, any other oxidation resistant carboxylate, including polycarboxylates, sulfonate, hexafluorophosphate, tetraphenyl borate ions, blends and mixtures of these ions, and the like.

In yet other embodiments the components are kept in separate containers until shortly before use and where one container contains the ferrate(VI) compound and the second container contains the phase transfer compound, and in some cases either container also contains a pH buffer, NaOH and/or KOH.

Some formulations include a non-oxidizable complexing compound (such as Dequest® 2021, potassium fluoride, potassium bifluoride, mono and/or poly phosphates, and the like).

Yet further embodiments include a hygroscopic compound such as hygroscopic anhydrous and hydrated compounds of lithium, sodium, potassium, tetraammonium and other quaternary amine, salts of the anions: hydroxide, orthophosphate tribasic, nitrate, molybdate, periodate, perchlorate, acetate, perchlorate, carbonate, phosphate monobasic, phosphate dibasic, pyrophosphate, citrate, fluoride, disulfate, silicate, methane sulfonate, methyl sulfate, and/or oxide, and the like. Most preferred hygroscopic compounds are those that are also deliquescent

DETAILED DESCRIPTION OF THE INVENTION AND BEST MODE

Figure 1:
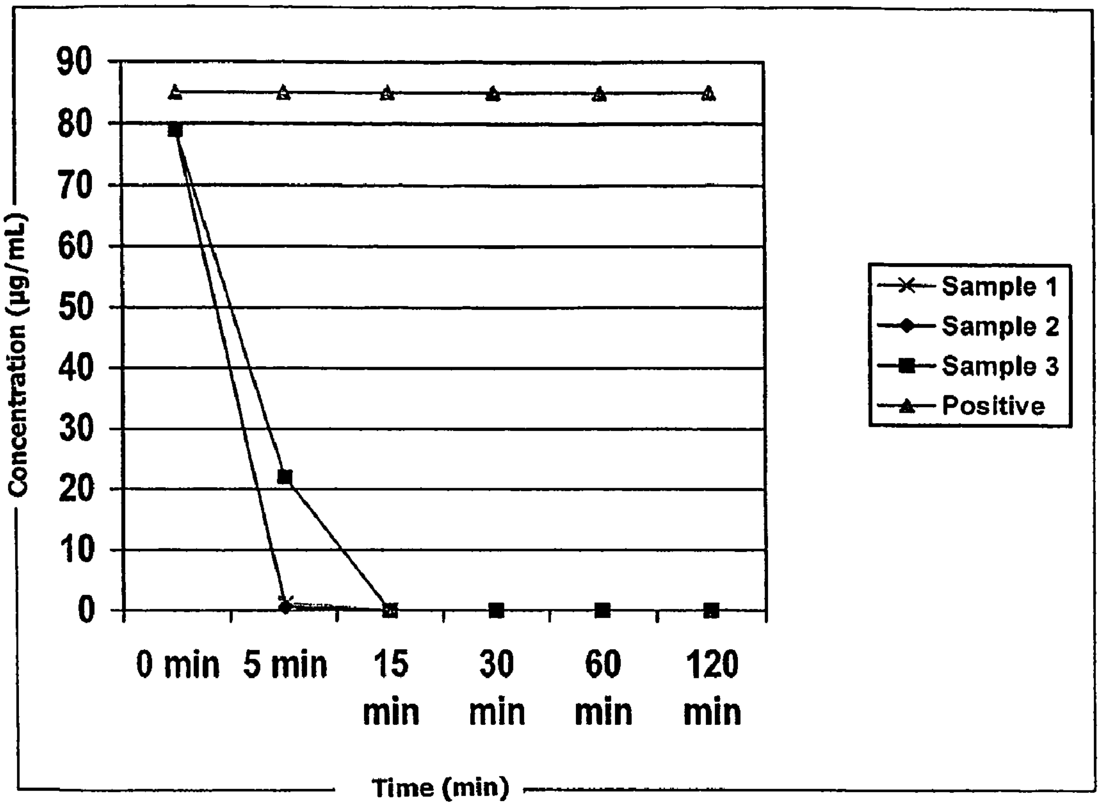
FIG. 1 is a graph showing the decontamination of GD nerve agent with ferrate(VI) ion, agent concentration versus time.

Decontamination of chemical warfare agents (CWAs) and other toxicants such as nonconventional toxic agents (NTAs) or toxic industrial chemicals (TICs) can lead to troublesome stable and still highly toxic products. Water content, reaction time, temperature, order of addition, matrix effects, and/or pH have been shown to be critical parameters to controlling reaction paths in decontamination chemistry towards forming nontoxic products and away from forming toxic residuals. The ferrate formulations described herein typically overcome these control requirements and problems due to the fast reactivity of ferrate over a broad range of pH and temperature, including ambient and cold temperatures. Decontamination as used herein means the degradation of chemical warfare agents (CWAs) and other toxicants to levels that are significantly lower than the original concentration.

Ferrates useful with the invention include $M_xFeO_4$ alone and in mixtures and blends, where M is a substantially non-oxidizable cation such as $K^+$, $Na^+$, $Li^+$, $Ca^{2+}$, $Mg^{2+}$, $Zn^{2+}$, $Ba^{2+}$, $Sr^{2+}$, $NR_4^+$, and $Al^{3+}$: where x=2 for the 1+ cations, x=1 for the 2+ cations, and x=2/3 for the 3+ cations (e.g. to yield $Al_2(FeO_4)_3$). In order for $NR_4^+$ (R's may be the same or different and the moiety may contain one or more quaternary ammonium groups) to be substantially non-oxidizable, particularly in the presence of ferrate(VI), the cation should not contain easily oxidized groups such as primary or secondary alcohols (3° alcohols are acceptable), phenolic groups, aldehyde groups, groups with an activated (easily eliminated or ionized hydrogens (for example α-hydroxy ketones, β-diketones, etc.). Preferably R is alkyl of any carbon number, and which can contain an aromatic hydrocarbon. Amine groups such as 1°, 2°, or 3° are not acceptable, however, 4° amine groups are. Saturated or unsaturated R groups are acceptable, but saturated groups are preferred. R groups containing halogens, halogenoids, nitro groups, alkoxy groups, are acceptable so long as they do not interfere with the action of the quaternary ammonium group. For example, the quarternary ammonium ion must have a octanol/water distribution coefficient >0.2, and preferrably >1.0, when the anion is chloride ion.

Chemical warfare agents present a potential threat to military and civilian populations. Toxicants such as herbicides, insecticides, rodenticides, chemical effluents, industrial chemicals, and the like when dumped or otherwise misused also represent dangers to humans, animals and plants and require rapid, non-destructive treatment to prevent widespread injuries and loss of property. Current decontamination formulations, however, have several shortfalls, including environmental hazards, health hazards, too corrosive of materials, short shelf life, practical use limitations, logistical management difficulties, and/or unsatisfactory is chemical warfare agent destruction efficiencies. Ferrate(VI) (e.g. as $K_2FeO_4$), or "ferrate" addresses these issues through its high oxidation potential, stable shelf life, benign reduced state, namely iron(III) hydrated oxide, ability to neutralize acids, drive hydrolysis reactions, and form coordinate covalent complexes with toxic chemical species such as cyanide ion, fluoride ion, hydrogen sulfide, etc. A series of bench-scale trials on surrogate and actual chemical warfare agents demonstrated the potential efficacy of $K_2FeO_4$ as a viable decontamination agent. Destruction efficiencies using paste and aqueous $K_2FeO_4$ formulations exceeded 99% for 2,2-dichloroethyl ether (a surrogate agent), mustard thio blister agent, and G-type (sarin, soman), and V-nerve agents. The reaction times needed were found to be as good as or better than commonly accepted decontaminants, such as bleach and sodium hydroxide. A surprising result of the ferrate treatments for the chemical warfare agents such as HD and VX is that highly toxic products were not formed at high pH such as a pH at and above 8.5. It is expected that this result will apply to other toxic materials.

Chemical warfare agents, when used militarily or in terrorist situations, leave a film of active agents on surfaces. These surfaces may include clothing, building structures, vehicles, equipment and many others. There are many conventional decontaminants currently being used for these toxic agents, however many of them have shortfalls. While most are able to effectively destroy the chemical warfare agents, many are corrosive to both the skin and the surfaces to which they are applied. For example, chlorine bleach and sodium hydroxide reagents destroy agents fairly effectively, however, both are corrosive and posses other environmental hazards. In addition, many decontaminants, both actively used and proposed, are unstable (with respect to loss of activity) and/or difficult to prepare, store and transport. The large class of organic and inorganic peroxides are examples of this situation. Potassium ferrate ($K_2FeO_4$) has been proven not only to effectively destroy a broad range of chemical warfare agents, but also addresses the shortfalls of the currently used chemical warfare agent decontaminants.

Ferrate has many attributes that make it ideal for use as a chemical warfare agent decontaminant including the following: 1) It is minimally hazardous and easily handled and stored. 2) It is an extremely strong oxidant (oxidation potential up to 2.2 volts depending on pH). 3) It possesses a broad spectrum of uses. Therefore, while it is able to not only decompose organics, it also encapsulates and precipitate toxic metal ions and other inorganic toxics such as arsenic and fluoride ion, complex phosphonate products produced from G and V agents, neutralize the acids formed during decontamination of vesicants such as mustard and Lewisite. 4) Its presence can easily be visually monitored as it undergoes a noticeable color change from intense violet to orange as it reacts and is depleted. 5) It is harmless to most surfaces and can be deployed in a number of manners (i.e. paste, dusting, including aerial dusting, powder, salve, cream, spray, solution for dipping, sprinkling, broadcasting, etc.).

The invention herein is typically effective against many organic hazardous agents: chemical warfare agents such as nerve gas (e.g. GB, VX, GD, and the like); vesicants (e.g. mustard gas, Lewisite (an organo arsenite chloride); and the like); explosive compounds (e.g. TNT, RDX (cyclonite), HMX, PETN, tetryl, and the like); organosolvents, including halogenated solvent (e.g. chloroform, perchloroethylene, and the like); fuel additives (e.g. MIBK octane enhancer), pesticides (e.g. DDT, chlordane, and the like); herbicides (e.g. carbamates, triazines, phosphonates (Roundup™) and the like). The compositions of the present invention avoid many of the intermediate compounds produced during decontamination treatment of the prior art that are themselves toxic or hazardous. Additionally, many of the prior art materials such as ozone, permanganate, chlorination, hydrogen peroxide are in themselves hazardous or damaging to equipment, buildings or skin, and/or have a short shelf-life. Additionally, some embodiments of the present invention provide for or enhance the removal of toxic residuals such as trihalomethanes, halogenated alkyl acids, phosphates, fluoride, arsenic, phosphonates, or toxic metal ions.

Buffers, useful with the invention to control pH, should be substantially non-oxidizable and typically include phosphate salts (e.g. monobasic, dibasic, tribasic, pyrophosphate, polyphosphates, polyphosphates), borates (borax, tetraborate, boric acid, sodium borate, carbonates (salts of hydrogen carbonate and carbonate), protected amines (alkyl and aryl), phosphonates, phosphinates, etc. and blends thereof. If there is sufficient buffering capacity or acid present from the matrix being treated, then additional buffer may not be required. Buffers are useful in controlling the pH of the reaction and/or in protecting a surface such as the skin or equipment, for example aluminum surfaces, from the corrosive effects of high pH. This pH control may be needed since the detoxification reaction tends to raise the pH if used in excess.

While not wishing to be bound by theory, it is presently believed that the expected oxidation and hydrolysis reaction (unbalanced) involved in general terms is as follows. The exemplary reaction is written for the chemical warfare agent Sarin reaction with ferrate, $$\underset{\text{Ferrate}}{FeO_4^{=}} + \underset{\text{sarin}}{(CH_3)_2CHO{-}P(F)({=}O)(CH_3)} \longrightarrow \underbrace{FePO_4 + FeF_3 + HCO_3^{-} + FeOOH}_{\text{nontoxic mineralized products}}$$

where the hydrated $FePO_4$, $FeF_3$, and FeOOH products are common, stable, nontoxic mineral materials and soluble ions. Also, the mild pH 8 buffer $HCO_3^-/CO_3^=$, is a nontoxic, water soluble ion that is the major component of baking soda and washing soda. The specific reaction stoichiometry depends on the type of chemical warfare agent involved, other oxidizable materials present, etc. In use, excess ferrate is added to ensure complete chemical warfare agent defeat (excess ferrate can be monitored easily by the purple color of the $FeO_4^=$). Hence the decontamination procedure simply amounts to treating with ferrate reagent in sufficient amount to maintain a purple coloration for at least about 15 min, but not more than two hours. The excess $FeO_4^=$ readily and completely decomposes to rust within seconds to minutes depending on pH. If desired, ferrate can be decomposed within seconds by washing/spraying with any number of mild reagents, including dilute vinegar solution, carbonated water, or soap and water. Generally:

GB (sarin): *i*PrO-P(F)(=O)CH3+K2FeO4→FePO4+FeF3+KHCO3+FeOOH

Fluorine has to be removed to render GB defeated.

GD (soman): *t*Bu-CH($CH_3$)O—P(F)($CH_3$)(=O)+$K_2FeO_4$→$FePO_4$+$FeF_3$+$KHCO_3$+FeOOH Fluorine has to be removed to render GB defeated.

And for VX: *i*$Pr_2NCH_2CH_2S$—P($CH_3$)(=O)(OEt)+$K_2FeO_4$→$Fe_2(SO_4)_3$+$Fe(NO_3)_3$+$KHCO_3$+FeOOH The sulfur reacts first and then the nitrogen. Typically, both would have to react to render VX nontoxic.

HD (mustard): $ClCH_2CH_2SCH_2CH_2Cl$+$K_2FeO_4$→$Fe_2(SO_4)_3$+$FeCl_3$+$KHCO_3$+FeOOH The sulfur would react first then the chlorines. Typically, the compound would have to be completely oxidized to be rendered nontoxic.

Lewisite: ClCH=CHAs$Cl_2$+$K_2FeO_4$→$FeAsO_4$+$FeCl_3$+$KHCO_3$+FeOOH

With the addition of Ferrate, either the double bond would be broken or the arsenic, As, would react. Typically, the compound would have to be completely oxidized to be rendered nontoxic. Note in the above reactions that a substantial amount of acid neutralization is required along with oxidation, hydrolysis, complexation and precipitation, in achieving agent decontamination. As the Examples will show, decontamination does not often require 100% mineralization as the formation of nontoxic organic products is acceptable as well, and in fact are preferred since less weight of ferrate would be required for unit weight of agent.

The present invention provides for a phase transfer catalyst (PTC) preferrably with a non-corrosive or oxidizable anion of minimal oil solubility, or with ferrate(VI) ion, as $FeO_4^=$ or $HFeO_4^-$. Since many hazardous chemicals are organic and typically oil soluble or are disseminated in an oil phase or may enter an oil phase on application, oil soluble phase transfer catalysts are preferred, preferrably with a octanol/water distribution coefficient ($K_{o/w}$) of >0.2, and most preferrably about ≧1. Typical oil soluble phase transfer catalysts include "Bis-Quat" {e.g. $(CH_3)_3N^+(CH_2)_6N(CH_3)_3^+$}; other di and mono charged alkyl and aryl onium compounds (e.g. ammonium, and phosmonium derivatives); combinations of a quat and ferrate (e.g. {$(R_4N^+)_2FeO_4^=$} where the two quaternary ammonium ions could be separate molecules (e.g. Aliquat™ 336, ({$(CH_3(CH_2)_7)$}$_3(CH_3)N^+X^-$), and the like, or combined in the same molecule {$(\text{Bis-Quat})^{2+}FeO_4^=$}, and the like, especially where one or more methyl groups are replaced with higher carbon number alkyl groups such as ethyl, isopropyl, n-propyl, n-butyl etc. including octyl and dodecyl groups, but not exceeding a carbon number of 16-18 (e.g. isostearo, hexyldecyl, etc. alkyl groups). Quaternary ammonium phase transfer catalysts with total carbon numbers between about 12 to 30 are useful with the invention. Compounds classified as phase transfer catalysts rather than detergents are most preferred. The phase transfer catalyst may be used at about 0.01% to about 50% of reagent, and preferably about 0.1-5%, and most preferrably about 0.5-3%. Preferrably water may be added in small amounts as needed, typically about 25-75 uL of water per 30 mL of reagent, but water can be present up to >98% water.

Detergents form emulsions and foams with low water soluble materials, which includes a number of problematic agents such as HD and VX, and with sulfidic fuels. Emulsification creates small droplets and high interfacial surface areas which can speed chemical reactions in which interfacial mass transport is rate determining. In this respect, oxidant stable cationic surfactant detergents are also useful with the invention as long as they exhibit acceptable oil emulsification and/or solubility. Effective surfactants of the invention with a total carbon number of the long chain moiety of the surfactant of about 10-16 are most preferred as they form the most stable micelles and vesicle macro-molecular structures. Examples of such cationic detergents are salts of $\{CH_3(CH_2)_{11}\}N(CH_3)_3^+$.

Most preferred suitable anions of the phase transfer catalysts and cationic detergents described above are sulfate ion, hydroxide ion, borate ion, and phosphate ion, and carbonate ion, with preferred anions being chloride ion, nitrate ion, methylsulfonate ion, acetate ion, and the like. It is most desired that the anion to the PTC is poorly extractable into oil phases so that ferrate ion extraction is instead preferred.

Hence, to favor ferrate transfer into the water immicible "oil" phase, such as HD, VX, JP8, Jet Fuel A, coal slurry, etc. is to have the $K_{o/w}$ value for ferrate as high as possible relative to the $K_{o/w}$ value of the counter ion of the PTC. In addition, lower water content aids enhanced partitioning of the ferrate into the water immiscible phase by the equation relating percent partitioning to phase ratio, or % Ferrate transferred to the "oil" phase$=100*K_{o/w}/(K_{o/w}+V_{aq}/V_{oil})$. It is noted that the % Ferrate transferred into the oil phase by this equation is a constant for a given set of conditions. Therefore as the ferrate is consumed through oxidation reactions for decontamination or fuel desulfurization, it is immediately replaced by more ferrate from the aqueous phase. Hence the mechanism of decontamination of oil soluble agents and fuels is that the ferrate, normally added as potassium ferrate(VI) for example, first dissolves in the water phase present, no matter how little water is present, then it partitions into the oil phase with the phase transfer cation. As the $HFeO_4$ species is far less hydrated than the dianion, $FeO_4^{=}$, lower pH values (e.g. 6-9) where the $HFeO_4^-$ species is present is preferred, as waters of hydration lower $K_{o/w}$ values.

Broadly, the ratio of water to fuel can range from 1:100 to 100:1; preferably 1:50 to 50:1, most preferably 1:10 to 10:1.

As mentioned, emulsion generating formulations can be effective. Suitable compounds could be selected from the class of alkyl sulfonates (not sulfates or phosphate esters). Suitable compounds are produced by the 3M Company, Specialty Chemicals Division, St. Paul, Minn.

Useful surfactants include FC-135 Fluorad Brand Cationic Surfactant, they should be about tetra C8, the total carbon number is then 4×8; also FC-98 FLURORAD Brand Fluorochemical Anionic Surfactant. Higher carbon numbers for the perfluorinated compounds increases strength of the micelles/vesicles formed allowing them to form at lower concentrations of surfactant and hence lowering surfactant use rates. These surfactants are typically used at about 0.01-0.04% of agent.

Other expected oxidation resistant surfactants include Dodecylbenzene sulfonic acid, sodium salt (anionic surfactant, Aldrich) and Dodecyltrimethyl ammonium salts (cationic surfactant, Aldrich). Preferably the detergents, surfactants are polyethers stable with the disclosed reactants and conditions. Preferably the surfactants should not contain primary or secondary alcohol groups as these are reactive, however tertiary alcohol groups are typically acceptable as they tend to be oxidation resistant.

Control of pH is typically preferred and depends on the materials. However in a broad embodiment a pH between about 3 and higher provides excellent results. In some embodiments a pH of about 3 to about 12 is preferred. A pH of about 6-12 is preferred for applications to the skin or other sensitive surfaces. For applications where it is desired to reduce the production of oxygen from ferrate oxidation of water, or other side reactions, a pH of about 8 and higher is desirable, and most preferred is a pH of about 8 to 12.

The examples herein are illustrative of invention and are not meant to limit the invention in any way. The first set of laboratory tests included three different areas of testing, all directly related.

Large Volume/High Water Content Tests.

The first phase of testing included high water content (relative to other phases of the testing), large volume kinetics studies. Purified potassium ferrate was prepared in powder form. The chemical warfare agents used in this phase of testing were soman (GD), VX and mustard (HD). A 25 mL aqueous solution of potassium ferrate and water was prepared in round bottom flasks immediately before testing. 500 mg of a specific chemical warfare agent was added to the solution and stirred for 1 hour. Aliquot samples were taken at predetermined times, a liquid chloroform extraction performed and the samples analyzed for residual chemical warfare agent using a Gas Chromatogram (GC) equipped with either a Flame Photometric Detector (FPD) or Flame Ionization Detector (FID).

Large Volume/High Water Content Tests with Phase Transfer Catalyst.

After examining the data from the first phase of testing (discussed further below), a determination was made to introduce a phase transfer catalyst into the ferrate decontamination formulation. The need for the phase transfer catalyst arose due to high water insolubility of some chemical warfare agents, specifically HD and VX. Not wishing to be bound by theory, it was believed that the destruction of HD and VX was hindered by mass transfer in the presence of large amounts of water. The insoluble characteristics of these agents, causes a high level of partitioning and in many cases, droplets of agent are visibly present in the solutions. A unique product was formed by combining a quat and ferrate. Specifically, Aliquat 336 ($\{(CH_3(CH_2)_7)\}_3CH_3N^+X^-$) was utilized where the two quaternary ammonium ions are separate molecules. Other phase transfer catalysts, along with emulsifiers and wetting agents were screened in bench-scale tests involving ferrate and chemical warfare agent surrogate 2,2-dichloroethyl ether (HD surrogate). The surrogate acts much as a real chemical warfare agent but is more difficult to degrade. A positive showing with surrogate indicates that the tested decontamination materials will work with similar chemical warfare agents. As a result of the tests Aliquat 336 was selected for use in the subsequent trials.

Once the surrogate screening process was completed, a test was conducted using HD. The chemical warfare agent was added directly to a 25 mL decontamination solution, this time containing ferrate and a phase transfer catalyst. Samples were taken at the completion of a two hour test time, and samples taken for analysis via GC-FPD/FID.

Small Flask Reactions

A third series of tests were performed with the chemical warfare agents VX and HD. The objective of these experiments was to further examine the effectiveness of the ferrate/phase transfer catalyst formulation. The agents VX and HD were specifically examined due to their hydrophobic characteristics. The determination was made, that these two agents represented the worst case scenario. The small flask reactions were divided into two types: "wet" and "dry." The "wet" experiments consisted of a 5 mL decontamination solution of different combinations of ferrate, phase transfer catalyst and the pH buffer $KH_2PO_4$. A molar ratio of decontaminant: chemical warfare agent molar of about 14:1 was used. The specific test matrices are outlined in the tables. The tests were conducted in 20 mL scintillation vials and stirred with a magnetic stir bar for 2 hours. The "dry" experiments were the same as the "wet" tests, with the exception of the water. There was no water added to the decontamination formulation, resulting in a paste-like decontaminating agent. In both the "wet" and "dry" tests, the entire matrix was extracted in chloroform at the completion of the test run and an aliquot of the extraction analyzed with a GC for residual chemical warfare agents.

Large Volume/High Water Content Results

The nerve agent GD was tested as follows. The data of Table D-1 and FIG. 1 illustrate the concentration of GD (μg/mL) in the solution over time. There was a ferrate:GD molar ratio of approximately 7.1:1 in these tests. All tests lasted 2 hours with specific sampling times throughout the length of the test, which were run in triplicate. A "positive" control sample (contains agent and no decontamination reagent) was included in the test, which consisted of a 25 mL solution of solvent which the GD was spiked into. The purpose of the "positive" control was to validate the agent application, sampling and extraction process. All "positive" controls remained within an acceptable range of the theoretical concentrations. As shown in FIG. 1, greater than 99% of the GD was destroyed within 5-15 minutes of reaction time. Y axis is agent concentration in μg/ml. X axis is reaction time in minutes.

TABLE D-1

| GD Sample Concentrations over Time | | | | | | | |
|---|---|---|---|---|---|---|---|
| Agent | | 0 min (Calculated) | 5 min | 15 min | 30 min | 60 min | 120 min |
| GD | Sample 1 | 100.4 | 1.1 | 0 | 0 | 0 | 0 |
| GD | Sample 2 | 100.4 | 0.5 | 0 | 0 | 0 | 0 |
| GD | Sample 3 | 100.4 | 22 | 0 | 0 | 0 | 0 |
| GD | Positive | 100.4 | — | — | — | — | 85* |

GD Sample Concentrations (μg/mL)
(0 = <0.5 μg/mL)
*Positive sample was only sampled at 120 minutes.

Detailed Procedure for Table D-1

Testing utilized 250 mL Erlenmeyer flasks as the reaction vessels and reactions took place in a sonication bath at 20.5° C.

Potassium ferrate in amounts able to obtain a ferrate:GD molar ratio of 7.1:1 were dissolved in 25 mL of DI water prior to being placed in the sonication bath. Using a 100-1000 μL pipettor, 500 μL of GD was added to each flask and the sonication initiated. A positive control was prepared by adding the same amount of GD to 25 mL of DI water without potassium ferrate present.

Solutions were reacted for 120 minutes with sampling times as indicated in the table.

Sampling was performed by using a 10-100 μL pipettor to pull a 50 μL aliquot from each sample at the indicated times. This aliquot was added to 10 mL of $CHCl_3$ pre-measured in 15 mL centrifuge tubes and vortexed for 2 minutes. A 2 mL aliquot was taken from the centrifuge tubes using a Pasteur pipette and added to a GC auto-sampler vial. Each GC vial was analyzed using a Gas Chromatograph equipped with a Flame Ionization Detector.

Figure 2:
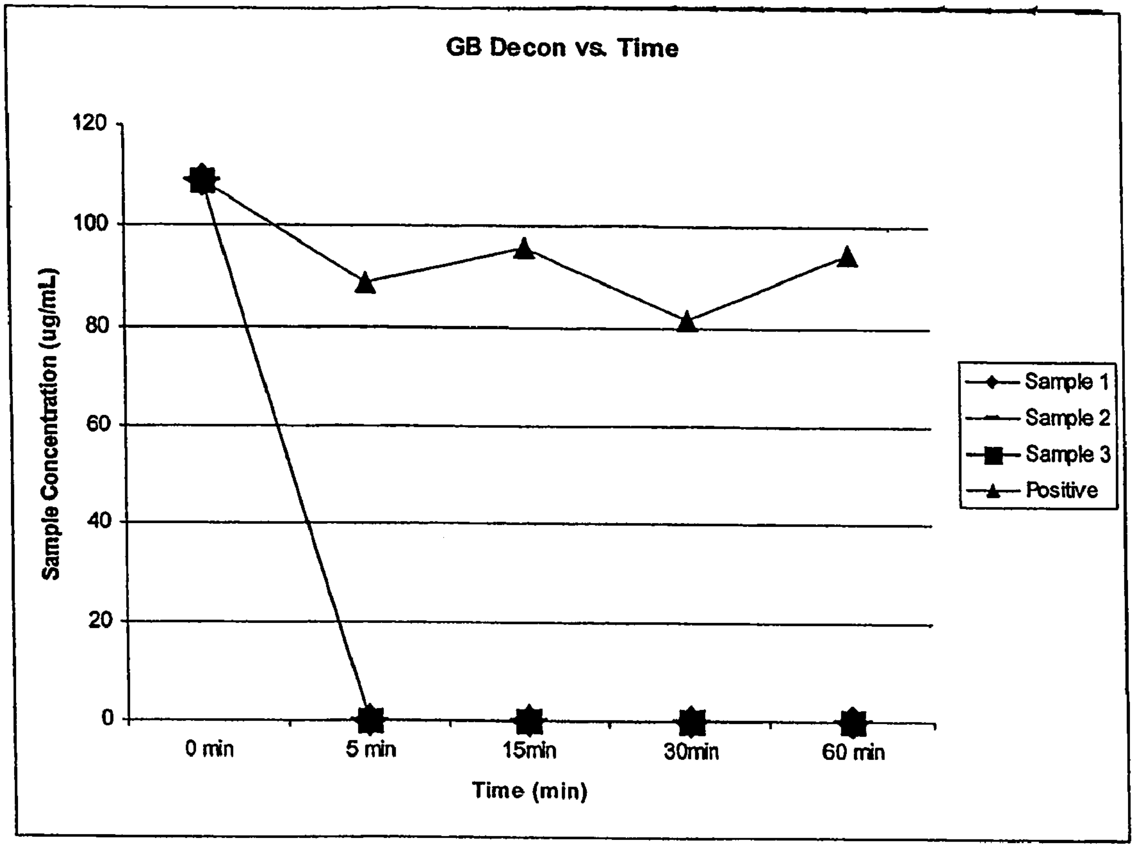
FIG. 2 is a graph showing the decontamination of GB nerve agent with ferrate(VI) ion, agent concentration over time.

Referring now to Table D-2 and FIG. 2. As shown in FIG. 2, about 99.5% was destroyed within 5 min of treatment.

TABLE D-2

| Concentration of GB over Time | | | | | | |
|---|---|---|---|---|---|---|
| Agent | | 0 min (Calculated) | 5 min | 15 min | 30 min | 60 min |
| GB | Sample 1 | 108.9 | <0.5 | <0.5 | <0.5 | <0.5 |
| GB | Sample 2 | 108.9 | <0.5 | <0.5 | <0.5 | <0.5 |
| GB | Sample 3 | 108.9 | <0.5 | <0.5 | <0.5 | <0.5 |
| GB | Positive | 108.9 | 88.7 | 96.0 | 81.5 | 94.5 |

GB Sample Concentrations (μg/mL)
(0 = <0.5 μg/mL)

Detailed Procedure for Table D-2

Testing utilized 250 mL Erlenmeyer flasks as the reaction vessels and reactions took place on a multi-position stir plate with straight-bar magnetic stirrers in each.

Potassium ferrate in amounts able to obtain a ferrate:GB molar ratio of 4:1 were added to 25 mL of DI water and mixing initiated. Using a 100-1000 μL pipettor, 500 μL of GB was added to each flask while mixing continued. A positive control was prepared by adding the same amount of GB to 25 mL of DI water without potassium ferrate present.

Solutions mixed continuously for 60 minutes with sampling times as indicated in the table.

Sampling was performed by using a 10-100 μL pipettor to pull a 50 μL aliquot from each sample at the indicated times. This aliquot was added to 10 mL of CHCl3 pre-measured in 15 mL centrifuge tubes and vortexed for 2 minutes. A 2 mL aliquot was taken from the centrifuge tubes using a Pasteur pipette and added to a GC auto-sampler vial. Each GC vial was analyzed using a Gas Chromatograph equipped with a Flame Ionization Detector.

Figure 3:
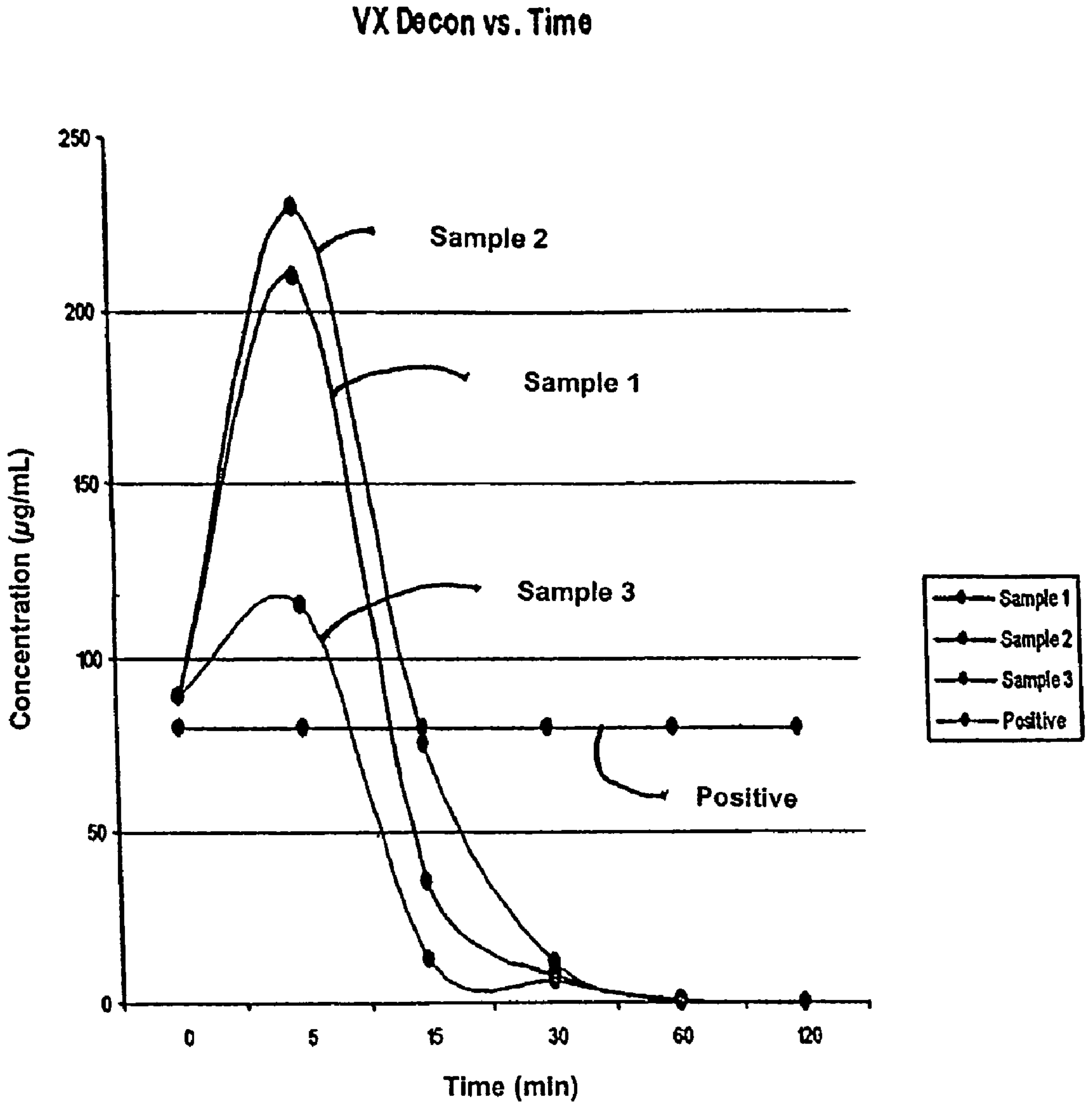
FIG. 3 is a graph showing the decontamination of VX nerve agent with ferrate(VI) ion, agent concentration over time.

Referring now to FIG. 3, the nerve agent VX was tested. The results however, were somewhat erratic for the nerve agent VX. As shown in FIG. 3, there was an initial spike in concentration at the first sampling time. In fact, the concentration appeared higher than the theoretical concentration as well as the "positive" control. This behavior is typical for situations involving non-homogeneous solution. Because of the insolubility of VX in water at alkaline pH, droplets or grains of agent were forming in the solution. It was this fact, as well as similar results with HD, that verified the advantages of the use of phase transfer catalysts and emulsifiers in the present invention to achieve high yields of decontamination and desulfurization.

The above results indicate that agents such as VX are more difficult to decontaminate. If agents such as GB and GD that appear easier to decontaminate are deployed with oils and the like that increase viscosity and or vapor pressure, then additional materials such as the phase transfer catalysts or emulsifiers of the present invention are needed.

Large Volume/High Water Content with Phase Transfer Catalyst Results

A small amount of testing was conducted utilizing the ferrate/phase transfer catalyst formulation in the larger volume/high water content reaction tests. Chemical warfare agents GB and HD were tested in this phase, with the GB exhibiting similar destruction rates as the GD from the first phase of testing. In fact greater than 99% of the GB was destroyed within 5 minutes of reaction time. This is not surprising, considering the high water solubility of GB. The GB test was identical to the previous tests described above, but included the phase transfer catalyst Aliquat 336.

A similar test was conducted with HD, however, rather than sampling at specific times throughout the length of the test, samples were only taken at the conclusion of the test. The tests were run in 250 mL round-bottom flasks with overhead stirring. The tests were run for two hours and triplicate samples taken from each flask at the completion of the test run. Table D-3 shows the test matrix and the results of the test. As illustrated in the table, all samples exhibited greater than 90% destruction of the HD. In retrospect, sample 2 two should have been without the phase transfer catalyst. Because sample number 2 exhibited greater than 90% destruction of HD, the results are not completely conclusive that the ferrate was responsible for the destruction of the HD. In fact, it could be that with the phase transfer catalyst present in sample 2, it allowed the HD to be hydrolyzed in the water. The third phase of testing addresses this issue through control samples which narrow down the effect of the individual components.

pipette to achieve the desired amount as indicated in the table. Solution was agitated for 30 seconds to dissolve the phase transfer catalyst.

2) To a separate 20 mL scintillation vial, the buffer $KH_2PO_4$ was added in the amounts indicated in the table.

3) To a separate 20 mL scintillation vial, Potassium Ferrate was added in the amounts indicated in the table.

Reaction Vessel Preparation and Reaction

1) The reaction vessel was a 250 mL round bottom two-neck flask.

2) The pre-weighed DI water/phase transfer catalyst solution was added to the reaction vessel.

3) The pre-weighed $KH_2PO_4$ was added to the reaction vessel.

4) 20 mL of DI water or 5% Clorox Bleach (as indicated in Table D-3) was added to the reaction vessel using a graduated pipette.

5) 0.5 mL (637 mg) of HD (mustard) was added to the reaction vessel using a 100-1000 UL pipettor (VWR Brand).

6) Overhead mixing was initiated. The mixer used was a VWR Brand General Purpose Mixer with variable speeds and equipped with a swivel paddle. The mixing speed was set at a rate that minimized splattering and ensured sufficient agitation.

7) Once mixing began, the pre-weighed potassium ferrate was slowly added to flask #1.

8) The time at which all of the ferrate was added to the reaction vessel marked the start time for that Flask #1. Start time for Flask #2 and #3 was the time at which the HD was added

TABLE D-3

HD Decon (Large Excess Reagent) using Ferrate

| Sample | Starting HD conc. mg (mg/mL) | Component A ($K_2Fe0_4$) (g) | Component B Phase Transfer Catalyst (g) | Component C Buffer (mg) | Water or Bleach Amount (mL) | Residual HD conc. μg/mL | Percent HD Reduction |
|---|---|---|---|---|---|---|---|
| 1.A | 605. (25.48.) | 7.0 | 1.01 | 13.03 | 25.0 (Water) | <0.5 | >99.998 |
| 1.B | 605. (25.48.) | 7.0 | 1.01 | 13.03 | 25.0 (Water) | <0.5 | >99.998 |
| 1.C | 605. 25.48) | 7.0 | 1.01 | 13.03 | 25.0 (Water) | <0.5 | >99.998 |
| 2.A | 637. (25.48.) | 0 | 1.02 | 12.94 | 25.0 (Water) | 16.81(1) | 99.93 |
| 2.B | 637. (25.48.) | 0 | 1.02 | 12.94 | 25.0 (Water) | 5.7(1) | 99.98 |
| 2.C | 637. (25.48) | 0 | 1.02 | 12.94 | 25.0 (Water) | 24.11(1) | 99.91 |
| 3.A | 637. (25.48) | 0 | 1.00 | 12.91 | 25.0 (5.25% Bleach) | <0.5 | >99.998 |
| 3.B | 637. (25.48) | 0 | 1.00 | 12.91 | 25.0 (5.25% Bleach) | <0.5 | >99.998 |
| 3.C | 637. (25.48) | 0 | 1.00 | 12.91 | 25.0 (5.25% Bleach) | <0.5 | >99.998 |

(1)Blank samples show erratic concentrations of HD due to the immiscibility of HD/water.

(2)Bleach reference performance is good but is excessively reactive, hazardous, highly corrosive. It is slow to react and leaves problem toxic byproducts. Proposed work will further quantify the results to lower levels to determine if residuals meet drinking water standards.

Procedure for Table D-3.

Pre-Weighing 1) 5 mL of DI water was added to a 20 mL scintillation vial using a volumetric pipette. The vial containing the 5 mL of DI water was placed on an analytical balance and the balance zeroed-out. The phase transfer catalyst, Aliquat 336 was added to the DI water drop-wise using a disposable Pasteur Sampling, Liquid Extraction and Analysis 1) After mixing for 2 hours, triplicate samples were taken from each reaction vessel.

2) Using a 10-100 μL pipettor (VWR Brand), a 50 μL sample was taken from the reaction vessel.

3) This aliquot was added to 10 mL of $CHCl_3$ that had been pre measured into a 15 mL disposable glass centrifuge tube.

4) The centrifuge tubes were vortexed for two minutes.
5) A 2 mL aliquot from the centrifuge was added to a GC auto-sampler vial.
6) The aliquot was analyzed on a Agilent 6890 Gas Chromatograph equipped with a Flame Photometric Detector.

Small Flask Reactions Results

From a decontamination standpoint HD and VX presented the greatest challenge for destruction. The ferrate/phase transfer catalyst formulation appeared to provide superior results for these agents. The reactions were made on a smaller scale with lower amounts of both decontaminant and chemical warfare agent. Table D-4 and Table D-5 illustrate the test matrices for two additional test runs, as well as the results.

4) Potassium ferrate was pre-weighed in separate 20 mL scintillation vials in amounts as indicated in Table D-4 to be added later to the appropriate samples as indicated in Table D-4.

Agent Addition and Reaction

1) All reaction vessels were placed on a multi-position stir plate.
2) Using a Hamilton syringe, 10 μL of VX was to the reaction vessels.
3) Using a volumetric pipette, 5 mL of DI water was added to each of the appropriate vessels as indicated In Table D-4.
4) The pre-weighed potassium ferrate was added to all appropriate reaction vessels as indicated in Table D-4.

TABLE D-4

Decontamination of VX

| Run # | AMOUNT OF VX Agent (mg) | AMOUNT Component A ($K_2FeO_4$) (mg) | AMOUNT Component B (PTC) (mg) | AMOUNT Component C (Buffer) (mg) | DI Water Amount (mL) | Chloroform Extraction Volume (mL) | Total Remaining VX (mg) | % VX Destruction |
|---|---|---|---|---|---|---|---|---|
| 1 | 10.1 | 260 | 50.8 | 148.4 | 0 | 10.0 | 1.65 | 83.7 |
| 2 | 10.1 | 260 | 57.2 | 134.1 | 0 | 10.0 | 0.776 | 92.3 |
| 3 | 10.1 | 260 | 51.1 | 133.2 | 0 | 10.0 | 0.657 | 93.5 |
| 4 | 10.1 | 0 | 0 | 159.8 | 0 | 10.0 | 7.87 | 22.1 |
| 5 | 10.1 | 260 | 0 | 166.2 | 0 | 10.0 | 3.71 | 63.3 |
| 6 | 10.1 | 260 | 46.5 | 142.0 | 5.00 | 10.0 | BDL | >99.95 |
| 7 | 10.1 | 260 | 46.2 | 159.2 | 5.00 | 10.0 | BDL | >99.95 |
| 8 | 10.1 | 260 | 47.4 | 129.3 | 5.00 | 10.0 | BDL | >99.95 |
| 9 | 10.1 | 0 | 0 | 152.9 | 5.00 | 10.0 | 3.69 | 63.5 |
| 10 | 10.1 | 260 | 0 | 131.6 | 5.00 | 10.0 | 0.005 | 99.95 |

The first five samples were mixed without added water, while the last five samples included water addition. The result of the Ferrate formulation appears more effective with water present. Proposed work will further quantify the results to lower levels to determine if residuals meet drinking water standards. BDL=below detection limit or <0.005 mg VX at these conditions.

Procedure for the materials of Table D-4.

Pre-Weighing

1) A star-head magnetic stir bar was placed in a 20 mL scintillation vial. This vial serves as the reaction vessel.
2) A pH buffer KH2PO4 was added to each scintillation vial containing the stir bar in the amounts indicated in Table D-4.
3) A phase transfer catalyst Aliquat 336 was added drop-wise to the appropriate vials containing the stir bar and buffer as indicated in the table in amounts as indicated in Table D-4.

5) Mixing was initiated and start time noted for the experiment. Mixing was set at a rate to minimize splattering and ensure sufficient agitation.

Sampling and Analysis 1) after mixing for 2 hours, sampling occurred.
2) Using a volumetric pipette, 10 mL of $CHCl_3$ was added to each of the reaction vessels.
3) Each solution was vortexed for 2 minutes.
4) A 2 mL aliquot from the solution was added to a GC auto-sampler vial.
5) The aliquot was analyzed on a Agilent 6890 Gas Chromatograph equipped with a Flame Photometric Detector The results indicate that the ferrate formulation may be more effective with water present.

BDL=below detection limit, l.e.r. <0.005 mg VX at these conditions.

Referring now to Table D-5:

TABLE D-5

Decontamination of HD warfare agent

| Sample No. | AMOUNT OF HD Agent (mg) | Component A ($K_2FeO4$) (mg) | Component B (mg) | Component C (mg) | DI WATER AMOUNT (mL) | Results Total HD Remaining (mg) | % HD Destruction |
|---|---|---|---|---|---|---|---|
| 3A | 12.4 | 270 | 49.7 | 141 | 0 | 1.22 | 90.2 |
| 3B | 12.4 | 280 | 49.9 | 140 | 0 | 1.60 | 87.1 |
| 3C | 12.4 | 268 | 51.3 | 147 | 0 | 2.69 | 78.3 |
| 3D | 12.4 | 0 | 47.3 | 144 | 0 | 11.15 | 10.1 |
| 3E | 12.4 | 262 | 0 | 141 | 0 | 9.96 | 19.7 |
| 4A | 12.4 | 273 | 71.8 | 141 | 5.00 | 1.10 | 91.1 |
| 4B | 12.4 | 261 | 44.1 | 172 | 5.00 | 1.50 | 87.9 |
| 4C | 12.4 | 262 | 50.5 | 146 | 5.00 | 1.38 | 88.9 |

TABLE D-5-continued

| Decontamination of HD warfare agent | | | | | | | |
|---|---|---|---|---|---|---|---|
| Sample No. | AMOUNT OF HD Agent (mg) | Component A ($K_2FeO4$) (mg) | Component B (mg) | Component C (mg) | DI WATER AMOUNT (mL) | Results Total HD Remaining (mg) | % HD Destruction |
| 4D | 12.4 | 0 | 0 | 172 | 5.00 | 1.68 | 86.5 |
| 4E | 12.4 | 261 | 0 | 156 | 5.00 | <0.003 | >99.9 |

NOTES:
HD - Density of 1.237 g/mL, purity of 97.7%.

Procedure for Table D-5.

Pre-Weighing

1. A star-head magnetic stir bar was placed in a 20 mL scintillation vial. This vial serves as the reaction vessel.
2. A pH buffer KH2PO4 was added to each scintillation vial containing the stir bar in the amounts indicated in Table D-5.
3. A phase transfer catalyst Aliquat 336 was added drop-wise to the appropriate vials containing the stir bar and buffer as indicated in the table in amounts as indicated in Table D-5.
4. Potassium ferrate was pre-weighed in separate 20 mL scintillation vials in amounts as indicated in the table to be added later to the appropriate samples as indicated in Table D-5.

Agent Addition and Reaction

1. All reaction vessels were placed on a multi-position stir plate.
2. Using a Hamilton syringe, 10 μL of HD was to the reaction vessels.
3. Using a volumetric pipette, 5 mL of DI water was added to each of the appropriate vessels as indicated in Table D-5.
4. The pre-weighed potassium ferrate was added to all appropriate reaction vessels as indicated in Table D-5.
5. Mixing was initiated and start time noted for the experiment. Mixing was set at a rate to minimize splattering and ensure sufficient agitation.

Sampling and Analysis

1. After mixing for 2 hours, sampling occurred.
2. Using a volumetric pipette, 5 mL of $CHCl_3$ was added to each of the reaction vessels.
3. Each solution was vortexed for 2 minutes.
4. A 0.2 mL aliquot from the solution was added to a GC auto-sampler vial.
5. The aliquot was analyzed on a Agilent 6890 Gas Chromatograph equipped with a Flame Photometric Detector.

As shown in the above tables, results for both HD and VX exhibit similar properties. In each of the tables, note that the first five samples are the "dry" tests (no water added) and the second five are the "wet" tests (5 mL of water added). It is apparent from the results of the "dry" samples, that removal of the phase transfer catalyst from the decontamination formulation significantly inhibits the destruction of the chemical warfare agent. This does not seem to be the case in the "wet" samples. It should be noted that visual observations made during laboratory tests, indicated a concern that during mixing, some of the chemical warfare agent may have "splattered" onto the upper walls of the reaction flask, thus not allowing it to come in contact with the decontaminant. With the entire contents of the flask being extracted at the completion of the test, all chemical warfare agent would have been detected, whether it had been it contact with the decontaminant or not.

Additional Decontamination Tests

Ferrate for these tests was produced by the methods disclosed in copending PCT Published Application No. WO 2005/069892 A2.

The final product of this method was a wet filter cake consisting of approximately 8-12% ferrate salt. This filter cake was converted to technical grade potassium ferrate crystals ($K_2FeO_4$TG) and used in thermal stability and decontamination formulation testing.

Conversion of the filter cake to $K_2FeO_4$ TG was achieved through a recrystallization protocol modified from the 1953 procedure described by Schreyer, J. M., G. W. Thompson, et al, "Potassium Ferrate," *Inorganic Synthesis,* 1953, 4, 164-168. The filter cake product was dissolved in dilute potassium hydroxide and filtered to remove insoluble iron oxide components. Solid potassium hydroxide then was added to the filtrate, driving the formation of the potassium ferrate salt. The solution was chilled to lower the solubility of potassium ferrate and then filtered. The potassium ferrate crystals obtained on the filter were washed with solvents to remove remaining potassium hydroxide and to aid in water removal. The dried potassium ferrate salt was stored in a vacuum desiccator with a strong desiccant to prevent atmospheric moisture from degrading the product. Each sample of $K_2FeO_4$ TG produced was then assayed for $K_2FeO_4$ content to ±2% absolute.

A total of four decontamination runs in triplicate using ferrate solutions and water controls were conducted at room temperature. Run 1, Run 2, and Run 3 were carried out with HD; Run 4, with VX. Of the three HD runs, Run 1 and Run 2 were conducted at a ferrate to HD wt/wt ratio of 22.5:1 (Run 1 under basic conditions at a pH of 10.5 and Run 2 at pH 7.0). Run 3 was conducted at pH 10.5, but at a reduced ferrate to HD wt/wt ratio of 2.7:1. In order to achieve the ferrate to HD wt/wt ratio of 2.7:1 for Run 3, the HD level was increased. (The established conventional decontamination reagent to agent ratio is 50:1.) The single VX run (Run 4) was made with a ferrate to VX wt/wt ratio of 45.5:1 and a pH 7.0. The pH of 7.0 is in the buffer range of orthophosphate and is low enough to avoid toxic reaction products of VX. All runs used only pre-thermally-treated potassium ferrate oxidant. Run 1 formulation and Run 2 formulation were chosen to provide the most desirable decontaminated agent product mixture, i.e., nontoxic products and minimal residual agent, with practical use. Hence, both formulations used mild reaction conditions of ambient temperature, mild pH, ambient pressure, and reagent use rates the same or lower than conventional decontamination reagents such as DF 200.

A detailed description of the four runs follows.

Run 1: Decontamination formulation 1.1 for treatment of HD with a large excess of potassium ferrate reagent at a pH of 10.5 using phase transfer catalyst.

A. To each of the three ferrate test (ferrate treatment) sample vials, 140 mg of potassium phosphate monobasic and 50 μL of Aliquat® 336 phase transfer catalyst were added. The amount of HD shown in the Tables F-1 to F3 was added, the vial capped and vortexed for 10 seconds; then 3 mL deionized water was added and the vial again vortexed for 10 seconds.

B. To each of the three reference (non-ferrate buffer) test sample vials, 31.5 mg of sodium bicarbonate, 27 μL of 10.0 N sodium hydroxide solution, and 50 μL of phase transfer catalyst were added.

C. Three additional empty vials were used as water blanks (water reference).

D. Finally, three vials were filled with approximately 278 mg of ~94% potassium ferrate crystals (260 mg of purity-adjusted material) and used in the testing of the ferrate treatments. Purge with argon gas and sealed until use.

E. To each of the vials from step A were added the contents of ferrate vials from step D. The vials were immediately vortexed three times for 10 seconds each. After each 10 second vortex the vial was cracked open and checked for gas formation. Each vial was then placed in a multivial shaker and shaken for 60 minutes.

F. HD as shown in Tables F-1 to F-3 was added to each of the vials from steps B and C. The vials were vortexed for 10 seconds; then 3 mL deionized water were added and again vortexed for 10 seconds. Finally the vials were placed in a multivial shaker for 60 minutes.

Referring now to Tables F-1 to F-3 per the procedure described above, 3.85 mg/mL of HD and a 22.5:1 mass ratio of ferrate to HD was used. All three ferrate treatments (samples FT-1, FT-2, and FT-3) turned a deep purple color upon ferrate addition. A small amount of gas release was heard when the vial cap was loosened after reaction due to a small amount of oxygen gas generation. Within 10 minutes of shaking, the color had turned brown, indicating a fast reaction of ferrate had occurred. The non-ferrate buffer references (samples pH-1, pH-2, and pH-3) became cloudy white after the final vortexing step and remained such through the 60-min shaking period. The water references (samples WR-1, WR-2, and WR-3) remained clear through all steps, with HD beading up in the water, due to its low water solubility. The negative control (samples NC-4, NC-5, and NC-6) observations were identical to the ferrate treatments but with no agent added.

The ferrate treatment (with an initial pH of <7 and a final reaction pH of 12.4±0.1) (Table F-1), resulted in a high average HD decontamination level of 99.1±0.2%. In the case of the non-ferrate buffer reference (with initial pH of ~7 and final reaction pH of 9.9±0.2), the average HD decontamination level of 88.9±0.5% was lower than the ferrate-treatment by 10% absolute. Even without the addition of buffer or ferrate, i.e. water-only reference (final pH of 2.1±0.2), a significant amount of HD removal occurred, 88±15%, but with an indication of more variability within the three replicates (96.51%, 97.08%, and 70.63%) (Table F-1). Supporting FS GC-MS qualitative product analysis results (Table F-3) indicated the absence of degradation products of concern, divinyl sulfone, dithiane, and thioxane, for the ferrate treatments.

Water is notorious for slow reaction rates and lack of consistency in decontaminating HD because of skinning over of the dispersed HD droplets by polymerization reactions in the water in which HD is poorly soluble, yet reactive. Therefore, the pH of the water reference samples plummeted to 2.1±0.2, due to the formation of HCl, a highly corrosive material. In contrast, the ferrate-generated base neutralized any acids that formed, such as HCl.

The gas formation mentioned above, appears to be caused by the low initial pH (<7) of the buffered system. In some embodiments of the invention, the buffer may be omitted. In that case, a gas would not be produced.

TABLE F-1

HD Decontamination Test Results by GC-MS Using Ferrate

| Sample Description | Sample ID | Run | pH After Reaction | HD Added (mg) | HD Remaining (mg) | HD Removed (%) | $K_2FeO_4$ Decontamination: Agent Ratio |
|---|---|---|---|---|---|---|---|
| Ferrate Trt* | FT-1 | 1 | 12.3 | 11.54 | 0.13 | 98.87 | 22.5 |
| Ferrate Trt | FT-2 | 1 | 12.5 | 11.54 | 0.10 | 99.10 | 22.5 |
| Ferrate Trt | FT-3 | 1 | 12.4 | 11.54 | 0.09 | 99.19 | 22.5 |
| | | | | Average→ | 0.11 | 99.1 | |
| | | | | Std Dev→ | 0.02 | 0.2 | |
| pH 10.5 Ref. | pH-1 | 1 | 9.9 | 11.54 | 1.24 | 89.26 | 0 |
| pH 10.5 Ref. | pH-2 | 1 | 9.9 | 11.54 | 1.35 | 88.30 | 0 |
| pH 10.5 Ref. | pH-3 | 1 | 9.9 | 11.54 | 1.25 | 89.17 | 0 |
| | | | | Average→ | 1.28 | 88.9 | |
| | | | | Std Dev→ | 0.1 | 0.5 | |
| Water Ref. | WR-1 | 1 | 2.3 | 11.54 | 0.40 | 96.51 | 0 |
| Water Ref. | WR-2 | 1 | 2.0 | 11.54 | 0.34 | 97.08 | 0 |
| Water Ref. | WR-3 | 1 | 2.1 | 11.54 | 3.39 | 70.63 | 0 |
| | | | | Average→ | 1.9 | 88.1 | |
| | | | | Std Dev→ | 1.7 | 15.1 | |
| Negative Control | NC-1 | 1 | 13.1 | 0.00 | ND | NA | 0 |
| Negative Control | NC-2 | 1 | 13.1 | 0.00 | ND | NA | 0 |
| Negative Control | NC-3 | 1 | 13.1 | 0.00 | ND | NA | 0 |
| Ferrate Trt. | FT-4 | 2 | 7.0 | 11.54 | 2.33 | 79.78 | 22.5 |
| Ferrate Trt. | FT-5 | 2 | 7.0 | 11.54 | 2.44 | 78.83 | 22.5 |
| Ferrate Trt. | FT-6 | 2 | 7.0 | 11.54 | 2.28 | 80.21 | 22.5 |
| | | | | Average→ | 2.4 | 79.6 | |
| | | | | Std Dev→ | 0.1 | 0.7 | |
| pH 7 Ref. | pH-4 | 2 | 7.8 | 11.54 | 6.56 | 43.17 | 0 |
| pH 7 Ref. | pH-5 | 2 | 8.4 | 11.54 | 6.33 | 45.16 | 0 |
| pH 7 Ref. | pH-6 | 2 | 8.4 | 11.54 | 6.56 | 43.17 | 0 |
| | | | | Average→ | 6.5 | 43.8 | |
| | | | | Std Dev→ | 0.1 | 1.2 | |
| Ferrate Trt. | FT-7 | 3 | 7.0 | 98.11 | 39.5 | 59.74 | 2.7 |
| Ferrate Trt. | FT-8 | 3 | 7.0 | 98.11 | 45.1 | 54.03 | 2.7 |

TABLE F-1-continued

| HD Decontamination Test Results by GC-MS Using Ferrate | | | | | | | |
|---|---|---|---|---|---|---|---|
| Sample Description | Sample ID | Run | pH After Reaction | HD Added (mg) | HD Remaining (mg) | HD Removed (%) | $K_2FeO_4$ Decontamination: Agent Ratio |
| Ferrate Trt. | FT-9 | 3 | 7.0 | 98.11 | 37.2 | 62.08 | 2.7 |
| | | | | Average→ | 40.6 | 58.6 | |
| | | | | Std Dev→ | 4.1 | 4.1 | |
| pH 10.5 Ref. | pH-7 | 3 | 6.9 | 98.11 | 79.3 | 19.17 | 0 |
| pH 10.5 Ref. | pH-8 | 3 | 6.7 | 98.11 | 63.5 | 35.28 | 0 |
| pH 10.5 Ref. | pH-9 | 3 | 7.0 | 98.11 | 64.8 | 33.95 | 0 |
| | | | | Average→ | 69.2 | 29.5 | |
| | | | | Std Dev→ | 8.8 | 8.9 | |

ND: Not-detect

NA: Not Applicable

Std Dev: Standard Deviation

*Ferrate Trt: Ferrate Formulation Treatment as per test protocol

TABLE F-2

HD and VX Qualitative Decontamination Product Results Using Ferrate and Reference Systems and Qualitatively[6] Identified by FS GC-MS[1] of Iso-Octane Extracts

| | | HD Run 1 Test Sample Identification | | | | HD Run 2 | |
|---|---|---|---|---|---|---|---|
| | | Ferrate Treatment | pH 10.5 Reference | Water Reference Replicate Identification | Negative Control | Ferrate Treatment | pH 7 Reference |
| Assignment Probable Source of Compound | | FT-1, FT-2, and FT-3 | pH-1, pH-2, and pH-3 | WR-1, WR-2, and WR-3 | NC-1, NC-2, and NC-3 | FT-4, FT-5, and FT-6 | pH-4, pH-5, and pH-6 |
| HD | 1,4-Dithiane | ND | ND | ND | ND | ND | X |
| PTC | 1-Octanamine, N,N-dioctyl- | X | X | X | X | X | |
| PTC | 1-Octanamine, N-methyl-N-octyl- | X | X | X | X | X | |
| TBD | 1-Undecanol | | | | | | |
| TBD | 2-Dodecene, (Z)- | | | | | | |
| Extraction Solvent | Cyclooctane | | | | | | |
| TBD | Cyclopropane, 1-methyl-2-octyl | | | | | | |
| TBD | Decane, 1-chloro | | | | | X | |
| TBD | Decanoic acid, decyl ester | | | | | | |
| HD | Divinyl Sulfone (DVSO2) | ND | ND | ND | ND | ND | ND |
| HD | HD | X | X | X | ND | X | X |
| Extraction Solvent | Octanoic acid, octyl ester | | | | | | |
| VX | O-Ethyl S-2-diisopropylaminoethyl ethylphosphonothiolate | NA | NA | NA | NA | NA | NA |
| HD | Sesquimustard | ND | ND | ND | ND | X | X |
| HD | Thiodiglycol (TDG) | ND | ND | ND | ND | ND | ND |
| HD | Thioxane | ND | ND | ND | ND | ND | ND |
| VX | VX[2] | NA | NA | NA | NA | NA | NA |

| | | HD Run 3 | | VX Run 4 Test Sample Identification | | | |
|---|---|---|---|---|---|---|---|
| | | Ferrate Treatment | pH 10.5 Reference | Ferrate Treatment Replicate Identification | pH 7 Reference | Water Reference | Negative Control |
| Assignment Probable Source of Compound | | FT-7, FT-8, and FT-9 | pH-7, pH-8, and pH-9 | FT-10, FT-11, and FT-12 | pH-10, pH-11, and pH-12 | WR-4, WR-5, and WR-6 | NC-4, NC-5, and NC-6 |
| HD | 1,4-Dithiane | ND | ND | NA | NA | NA | NA |
| PTC | 1-Octanamine, N,N-dioctyl- | | X | X | | | X |

TABLE F-2-continued

HD and VX Qualitative Decontamination Product Results Using Ferrate and Reference Systems and Qualitatively[6] Identified by FS GC-MS[1] of Iso-Octane Extracts

| | | | | | | | |
|---|---|---|---|---|---|---|---|
| PTC | 1-Octanamine, N-methyl-N-octyl- | X | X | X | | | X |
| TBD | 1-Undecanol | X | | X | | | X |
| TBD | 2-Dodecene, (Z)- | | | X | | | X |
| Extraction Solvent | Cyclooctane | | X | X | | | X |
| TBD | Cyclopropane, 1-methyl-2-octyl | | | X | | | |
| TBD | Decane, 1-chloro | | | X | | | X |
| TBD | Decanoic acid, decyl ester | | | X | | | X |
| HD | Divinyl Sulfone (DVSO2) | X | ND | NA | NA | NA | NA |
| HD | HD | X | X | NA | NA | NA | NA |
| Extraction Solvent | Octanoic acid, octyl ester | | | X | | | |
| VX | O-Ethyl S-2-diisopropylaminoethyl ethylphosphonothiolate | NA | NA | ND | X | X | ND |
| HD | Sesquimustard | X | ND | NA | NA | NA | NA |
| HD | Thiodiglycol (TDG) | ND | ND | NA | NA | NA | NA |
| HD | Thioxane | ND | ND | NA | NA | NA | NA |
| VX | VX[2] | NA | NA | ND | ND | X | ND |

[1]These results include both significant and insignificant, but detectable, amounts of the compounds found. (Quantitative analyses are provided in the following tables for key and major compounds.)
[2]Note that VX results are very qualitative since VX does not GC well due to the high water solubility of the $VXH^+$ cation formed at medium pH values. Therefore LC-based assays were used for VX (see below).
[3]"X" corresponds to present (Tentative identification based on NIST library reverse search with match criteria of generally 80% or higher)
[4]Many of the compounds listed are believed to be associated with the iso-octane extraction solvent. Not all solvent-related compounds identified were included in this table. Future testing should use a less complex extraction solvent.
[5]The P-ethyl impurity in the stock VX was also destroyed by ferrate as it did not show up in this GC chromatogram..
[6]Detection limit is 0.5 μg/ml.

D Decontamination Products for Run #1: Quantitative Product Analyses by LC-MS-MS According to the LC-MS-MS results for ferrate-treatment (samples FT-1, FT-2, and FT-3) in Table F-3, an absence was noted for both desirable products, divinyl sulfone (divinyl sulfone) (<13 μg/mL) and thiodiglycol sulfone (thio diglycol sulfone), and for the undesirable product, thiodiglycol (Thio diglycol) (<13 μg/mL). It is possible for thiodiglycol to be reconverted to HD. However, consistent with literature predictions, problematic toxic thio diglycol was formed at similar concentrations in both the non-ferrate buffer treatment and the water-reference treatment samples (pH-1, pH-2, and pH-3 averaging 910±105 μg/mL, and WR-1, WR-2, and WR-3 averaging 1160±460 μg/mL respectively). In addition, Table F-3 revealed that thio diglycol sulfone and divinyl sulfone were absent for both the non-ferrate buffer reference (<133 μg/mL and <33 μg/mL, respectively) and the water-reference (<667 μg/mL and <167 μg/mL, respectively). As required, negative control samples (NC-1, NC-2, and NC-3) were absent for thio diglycol (<0.25 μg/mL). Likewise, divinyl sulfone (<0.25 μg/mL) and thio diglycol sulfone (<0.25 μg/mL) were absent in all of the negative control samples. Hence, since the full scan GC and LC did not show the presence of additional organic products, ferrate not only did not produce toxic products, it largely converted HD nontoxic small molecules and/or provided full mineralization.

The amount of buffer employed in Run 1 was found to be insufficient to prevent the pH from rising to 12.4±0.1, above the objective pH of 10.5. It is noted however that pH 9-10 is an un-buffered region for the chemistry under consideration. Since toxic products were not found in Run 1, the need to control pH does not appear to be critical to controlling toxic products formation when ferrate is the decontamination reagent. Also, Run 1 demonstrated the capacity for ferrate to generate hydroxide ions, useful for hydrolysis agent decontamination activity in addition to oxidation, and in neutralizing acids so formed, thereby providing several decontamination chemistries which boost decontamination activity per unit weight of reagent still further.

It was shown that even at a final pH of 12.4, formation of toxic products from HD was not found when ferrate was present. Hence, this dual capacity to provide hydroxide ion for hydrolysis and acid neutralization reactions and oxidant for fast decontamination reactions is seen as illustrating the potential for a high level of agent decontamination per unit weight of ferrate. For HD, water and high pH readily form a large yield of toxic products. However, toxic products are not formed at high pH when ferrate was present.

Important differences were noted about the final products when comparing results of HD with and without ferrate. Only extractant solvent organic products could be found by FS GC-MS (Table F-2), and no target analytes by LC-MS-MS for samples with ferrate (FT-1, FT-2, FT-3, NC-1, NC-2, and NC-3) (Table F-3). However, for samples with no ferrate (encompassing non-ferrate buffer; samples pH-1, pH-2, and pH-3 and water reference, samples WR-1, WR-2, and WR-3) toxic or potentially toxic products were formed. For the non-ferrate buffer, undesirable thio diglycol averaged 910±105 μg/mL, with a yield of 103±12%, and produced no desirable divinyl sulfone or thio diglycol sulfone.

Run 2: Decontamination formulation 1.2 for treatment of HD with a large excess of potassium ferrate reagent at a pH of 7.0 using phase transfer catalyst.

A. To each of the three ferrate test sample vials (ferrate treatment), 750 mg of potassium phosphate monobasic and 50 μL of Aliquat® 336 phase transfer catalyst were added. The amount of HD shown in the Tables F-1 to F3 was added, the vial capped and vortexed for 10 seconds; then 3 mL deionized water was added and the vial again vortexed for 10 seconds.

B. To each of the three reference test sample vials, 372 mg of potassium phosphate monobasic, 624 mg of dipotassium hydrogen phosphate trihydrate and 50 μL of phase transfer catalyst were added.

C. Three additional empty vials were reserved to be used as water blanks.

D Finally, three vials were filled with approximately 281 mg of ~93% potassium ferrate crystals (260 mg of purity-adjusted material) purged with argon gas and sealed until use. These three vials were mixed with the contents of the ferrate test sample vials during the HD decontamination testing.

E. To each of the vials from step A were added the contents of ferrate vials from step D. The vials were immediately vortexed three times for 10 seconds each. After each 10 second vortex the vial was cracked open and checked for gas formation. Each vial was then placed in a multivial shaker and shaken for 60 minutes.

F. HD as shown in Tables F-1 to F-3 was added to each of the vials from steps B and C. The vials were vortexed for 10 seconds; then 3 mL deionized water was added and the vial again vortexed for 10 seconds. Finally the vials were placed in a multivial shaker for 60 minutes.

HD Decontamination Using Ferrate with Final pH of 7

Decontamination Testing of HD Decontamination Using Ferrate Formulation with Product Analysis by FS GC-MS and LC-MS-MS Per the procedures described above, 3.85 mg/mL of HD and a 22.5:1 mass ratio of ferrate to HD were used. Observations for all three ferrate treatments (samples FT-4, FT-5, and FT-6) were identical to those of Run 1, except that bubbling was observed when the ferrate was added. This gassing is known to be due to the much higher amount of acid phosphate buffer added to attain a final pH closer to neutrality. The observations for the non-ferrate buffer reference (samples pH4, pH-5, and pH-6) were identical to those of Run 1 despite the lower final pH of Run 2 indicating that the pH or the phosphate ion of the buffer did not measurably affect the reaction path, the reaction being dominated by hydrolysis in this pH range and at ambient temperature.

The ferrate treatment of Run 2, with final reaction pH=7.0±0.1 (Table F-1), resulted in a significant but lower average HD decontamination level of 79.6±0.7% than the 99.1% found for Run 1. In the case of the non-ferrate buffer reference (pH 8.2±0.2), HD decontamination resulted in a substantial drop to 44±1% decontamination, or about ½ the decontamination attained by the ferrate treatment at otherwise similar conditions. Supporting FS GC-MS qualitative results indicate the absence of known HD degradation products, i.e. divinyl sulfone, dithiane, and thioxane with the exception of detecting dithiane in the non-ferrate buffer reference samples (Table F-3). Hence, as with Run 1 conditions, Run 2 conditions also did not result in problematic toxicity products when ferrate was used, and the yield of decontamination with ferrate is far better than water hydrolysis at neutral pH.

Quantitative Product Analyses by LC-MS-MS. The LC-MS-MS results in Table F-3 revealed that the less desirable thio diglycol was detected at an average concentration of 196±70 μg/mL at the lower pH of Run 2, giving an average yield of 22±8% in the ferrate treatment (samples FT-1, FT-2, and Fr-3) based on the starting amount of HD introduced.

It is noted that yield in this case is relative to the case where if 100% of the agent is converted to the product for which the percentage is given. High percentages are desired for low toxicity compounds and low to zero percentages are desired for high toxicity compounds.

In addition, Table F-3 revealed that divinyl sulfone and thio diglycol sulfone were absent (<53 μg/mL and <13 μg/mL, respectively) in the ferrate treatment. However, undesirable thio diglycol was formed 17 times greater in the non-ferrate buffer treatment, (samples pH-5 and pH-6) (1,010±54 μg/mL) than in the ferrate-treatment. This amount represents ~100% (114±6%) of HD to thio diglycol in the case of non-ferrate reference. Similar to the ferrate treatment samples, divinyl sulfone and thio diglycol sulfone were absent (<167 μg/mL and <667 μg/mL, respectively) in the non-ferrate buffer samples (Table F-3).

Hence, the results reveal that the thio diglycol levels for non-ferrate buffer samples are 17 times greater than the thio diglycol levels for ferrate treated samples at the test conditions of pH7.

Since significant gassing was observed, and this is known to be due to the very low starting pH (~3) provided by the orthophosphate, monobasic pH buffer used in an attempt to provide a final pH of the reaction mixture of about 7 versus an alkaline pH as was the objective in Run 1. Since Run 2 results were lower yielding than Run 1 results, and incompletely reacted HD and HD intermediates were found in Run 2 but not Run 1, this result suggests that the lower pH did not enhance the desired decontamination chemistry despite the use of the same amount of ferrate reagent. In fact, the gassing may indicate a significant loss of ferrate material by the water oxidation to $O_2$ side reaction due to the low pH effect on increasing ferrate's oxidation potential, thereby resulting in insufficient ferrate residual to achieve the amount needed for full decontamination. Hence it appears that in some applications the acidic buffer can be omitted, or at least reduced, from the formulation. This is an extremely significant result as the combination of less acid buffer and less ferrate decomposed in a side reaction provides a very active reagent, as evidenced by the Run 1 results. This change would increase the decontamination capacity of ferrate ion as well. Alternatively, more ferrate could be used at the lower pH.

TABLE F-3

HD Decontamination Product Results by LC-MS-MS Using Ferrate Decontamination Reagent

| Sample Description | Replicate Sample ID | Run | Initial HD Added μg/mL | Maximum DVSO2 possible μg/mL | Found DVSO2 by LC-MS-MS μg/mL | Yield of DVSO2 % | Maximum TDG possible μg/mL | Found TDG by LC-MS-MS μg/mL | Yield of TDG % | Maximum TDGO2 possible μg/mL | Found TDGO2 by LC-MS-MS μg/mL | Yield of TDGO2 % |
|---|---|---|---|---|---|---|---|---|---|---|---|---|
| Ferrate | FT-1 | 1 | 3850 | 857 | ND | NA | 886 | ND | NA | 1120 | ND | NA |
| Ferrate. | FT-2 | 1 | 3850 | 857 | ND | NA | 886 | ND | NA | 1120 | ND | NA |
| Ferrate. | FT-3 | 1 | 3850 | 857 | ND | NA | 886 | ND | NA | 1120 | ND | NA |
| | | | | Average→ | ND | NA | | ND | NA | | ND | NA |
| | | | | Std dev→ | NA | NA | | NA | NA | | NA | NA |
| pH 10.5 Ref. | pH-1 | 1 | 3850 | 857 | ND | NA | 886 | 892 | 101 | 1120 | ND | NA |
| pH 10.5 Ref. | pH-2 | 1 | 3850 | 857 | ND | NA | 886 | 816 | 92.1 | 1120 | ND | NA |

TABLE F-3-continued

HD Decontamination Product Results by LC-MS-MS Using Ferrate Decontamination Reagent

| Sample Description | Replicate Sample ID | Run | Initial HD Added µg/mL | Maximum DVSO2 possible µg/mL | Found DVSO2 by LC-MS-MS µg/mL | Yield of DVSO2 % | Maximum TDG possible µg/mL | Found TDG by LC-MS-MS µg/mL | Yield of TDG % | Maximum TDGO2 possible µg/mL | Found TDGO2 by LC-MS-MS µg/mL | Yield of TDGO2 % |
|---|---|---|---|---|---|---|---|---|---|---|---|---|
| pH 10.5 Ref. | pH-3 | 1 | 3850 | 857 | ND | NA | 886 | 1023 | 115 | 1120 | ND | NA |
| | | | | Average→ | ND | NA | | 910 | 103 | | ND | NA |
| | | | | Std dev→ | NA | NA | | 105 | 12 | | NA | NA |
| Water Ref. | WR-1 | 1 | 3850 | 857 | ND | NA | 886 | 1040 | 118 | 1120 | ND | NA |
| Water Ref. | WR-2 | 1 | 3850 | 857 | ND | NA | 886 | 1660 | 188 | 1120 | ND | NA |
| Water Ref. | WR-3 | 1 | 3850 | 857 | ND | NA | 886 | 771 | 87.0 | 1120 | ND | NA |
| | | | | Average→ | ND | NA | | 1160 | 131 | | ND | NA |
| | | | | Std dev→ | NA | NA | | 460 | 52 | | NA | NA |
| Negative Control | NC-1 | 1 | 0 | NA | ND | NA | NA | 0.9 | NA | NA | ND | NA |
| Negative Control | NC-2 | 1 | 0 | NA | ND | NA | NA | <0.25 | NA | NA | ND | NA |
| Negative Control | NC-3 | 1 | 0 | NA | ND | NA | NA | <0.25 | NA | NA | ND | NA |
| | | | | Average→ | ND | | | 0.5 | | | ND | |
| | | | | Std dev | NA | | | 0.4 | | | NA | |
| Ferrate | FT-4 | 2 | 3850 | 857 | ND | NA | 886 | 178 | 20.1 | 1120 | ND | NA |
| Ferrate | FT-5 | 2 | 3850 | 857 | ND | NA | 886 | 136 | 15.4 | 1120 | ND | NA |
| Ferrate | FT-6 | 2 | 3850 | 857 | ND | NA | 886 | 273 | 30.8 | 1120 | ND | NA |
| | | | | Average→ | ND | NA | | 196 | 22.1 | | ND | NA |
| | | | | Std dev | NA | NA | | 70.1 | 7.9 | | NA | NA |
| pH 7 Ref. | pH-4 | 2 | 3850 | 857 | ND | NA | 886 | ND (6) | NA | 1120 | ND | NA |
| pH 7 Ref. | pH-5 | 2 | 3850 | 857 | ND | NA | 886 | 1047 | 118 | 1120 | ND | NA |
| pH 7 Ref. | pH-6 | 2 | 3850 | 857 | ND | NA | 886 | 971 | 110 | 1120 | ND | NA |
| | | | | Average→ | ND | NA | | 1009 | 114 | | NA | NA |
| | | | | Std dev | NA | NA | | 54 | 6.1 | | NA | NA |
| Ferrate. | FT-7 | 3 | 32,700 | 7,280 | 297 | 4.1 | 7,530 | <67 | 0.9 | 9,510 | ND | NA |
| Ferrate. | FT-8 | 3 | 32,700 | 7,280 | 212 | 2.9 | 7,530 | <67 | 0.9 | 9,510 | ND | NA |
| Ferrate | FT-9 | 3 | 32,700 | 7,280 | 324 | 4.5 | 7,530 | ND | 0.9 | 9,510 | ND | NA |
| | | | | Average→ | 278 | 3.8 | | <67 | 0.9 | | ND | NA |
| | | | | Std dev | 59 | 0.8 | | NA | 0.0 | | NA | NA |
| pH 10.5 Ref. | pH-7 | 3 | 32,700 | 7,280 | ND | NA | 7,530 | <33 | 0.4 | 9,510 | ND | NA |
| pH 10.5 Ref. | pH-8 | 3 | 32,700 | 7,280 | ND | NA | 7,530 | <33 | 0.4 | 9,510 | ND | NA |
| pH 10.5 Ref. | pH-9 | 3 | 32,700 | 7,280 | ND | NA | 7,530 | 41 | 0.9 | 9,510 | ND | NA |
| | | | | Average→ | ND | NA | | 25 | 0.6 | | ND | NA |
| | | | | Std dev | NA | NA | | 14 | 0.3 | | NA | NA |

FOOTNOTES:

1. NA: Not Applicable or Not Available, depending on context.

2. ND: Not Detected (For cases where sample triplicates contained at least one real value and one ND, the ND samples were given a value equal to the sample detection limit was used in order to carry out calculations, as seen with FT-7, FT-8, and FT-9 for TDG)

3. Note:

For cases where sample triplicates contained a "<XX", a value of "½*XX" was used in order to carry out average and standard deviation calculations, as seen with pH-7, pH-8, and pH-9 for TDG)

4. Ion ratios out of range were found occasionally for highly diluted samples and so was taken to indicate noise. These are non-scan analyses which use two ion mass peaks most ideal for the assay and checks to make sure the ratio of the peak intensities is constant and the value determined by standards. Out of range ratios can indicate excessive noise if S/N is low, or, if S/N is strong, the presence of an interference. In this work, all of these conditions corresponded to the former. In future work, these conditions will be alleviated by re-analysis of the sample.

1. Concentration above calibration curve. Result is estimated.

2. Sample was over diluted and not reanalyzed.

DVSO2—divinylsulfone;

TDG—thiodiglycol;

TDGO2—thiodiglycolsulfone

Run 3: Decontamination formulation 1.3 for treatment of HD with an excess of potassium ferrate reagent at a pH of 10.5 using phase transfer catalyst.

A. To each of the three ferrate test sample vials, 140 mg of potassium phosphate monobasic and 50 µL of Aliquat®.336 phase transfer catalyst were added. The amount of HD shown in the Tables F-1 to F3 was added, the vial capped and vortexed for 10 seconds; then 3 mL deionized water was added and the vial again vortexed for 10 seconds.

B. To each of the three reference test sample vials, 31.5 mg of sodium bicarbonate, 27 µL of 10.0 N sodium hydroxide solution and 50 µL of phase transfer catalyst were added.

C. Three additional empty vials were reserved to be used as water blanks.

D. Finally, three vials were filled with approximately 281 mg of ~93% potassium ferrate crystals (260 mg of purity-adjusted material). These three vials were mixed with the contents of the ferrate test sample vials during the HD decontamination testing.

E. To each of the vials from step A were added the contents of ferrate vials from step D. The vials were immediately vortexed three times for 10 seconds each. After each 10 second vortex the vial was cracked open and checked for gas formation. Each vial was then placed in a multivial shaker and shaken for 60 minutes.

F. HD as shown in Tables F-1 to F-3 was added to each of the vials from steps B and C. The vials were vortexed for 10 seconds; then 3 mL deionized water was added and the vial again vortexed for 10 seconds. Finally the vials were placed in a multivial shaker for 60 minutes.

Decontamination Testing and Analysis by GC-MS

Per the procedures described above, 32.7 mg/ml of HD and a 2.7:1 mass ratio of ferrate to HD was used. This was accomplished by increasing the amount of HD added to the formulation used in Run 1. All three ferrate treatments (samples FT-7, FT-8, and FT-9) turned a deep orange color upon ferrate addition, were warm to the touch, and produced off gassing when the vial cap was loosened. Within 10 min of shaking, the color had turned to brown. The observations for the non-ferrate buffer reference (samples pH-7, pH-8, and pH-9) were identical to those of Run 1 and Run 2, and hence provide three repeats at this condition with three replicates each; all were found to agree. The ferrate treatment (pH 7.0±0.1) shown in Table F-1 resulted in a low decontamination level of 59±1%. In contrast, the non-ferrate buffer reference (pH 6.9±0.1) resulted in a substantial drop to 29±9% decontamination when compared to the ferrate treatment. Supporting FS GC-MS qualitative results indicated the absence of divinyl sulfone, dithiane, and thioxane with the exception of detecting divinyl sulfone in the ferrate treatment (samples FT-7, FT-8, and FT-9) (Table F-2).

The percent HD destruction under a neutral pH (pH 7.0±0.1) and a low ferrate to HD ratio of 2.7:1 wt/wt (samples Fr-7, FT-8, and FT-9) was 59±1%, well less than both Run 1 and Run 2 (Table F-1). Hence the decontamination yield of ferrate is dependent upon the mole ratio and pH used, and that the best conditions, at least for HD decontamination, are those represented by Run 1.

The non-ferrate buffer (pH 6.9±0.1) resulted in a lower decontamination yield than in Run 1 and Run 2 (only 29±9%). The low ferrate/agent ratio of 2.7:1 apparently had too little ferrate to fully decontaminate the HD. Hence higher ratios are needed to fully decontaminate HD, greater than about 3.0 but about <22.5.

HD Decontamination at Low Ferrate/Agent Ratio: Quantitative Product Analyses by LC-MS-MS.

The LC-MS-MS results in Table F-3 revealed that the less desirable thio diglycol was detected at an average concentration of 24±11 μg/mL in two of the three replicates, giving an average low yield of 0.9±0.0% in the ferrate treatment (samples FT-7, FT-8, and FT-9). In addition, divinyl sulfone was detected at an average concentration of 278±59 μg/mL for an average low yield of 3.8±0.8%. Thio diglycol sulfone was absent (<267 μg/mL) in the ferrate treatment samples (Table F-3). Similar to the ferrate treatment, the non-ferrate buffer (samples pH-7, pH-8, and pH-9) revealed the formation of the less desirable thio diglycol (32±7 μg/mL, with an average low yield of 0.4±0.1%). In addition, divinyl sulfone and thio diglycol sulfone were absent (<33 μg/mL and <133 μg/mL, respectively) in the non-ferrate buffer samples.

Hence, at this low ratio of 2.7:1, insufficient ferrate was present to destroy fully the normal hydrolysis product produced by the water present in the reaction mixture.

Summary Chemical Equations for HD Decontamination Using Ferrate

Chemical equations consistent with the results for HD Run 1, Run 2, and Run 3 are assigned tentatively for the tested conditions and 60 min reaction time as follows (unbalanced):

Run 1: Ferrate Treatment (pH 10.5 Target, but Rising to 12.2)

HD + xs $FeO_4^{=}$ → low carbon number nontoxic organics (LCNNTO) and/or inorganic mineralization 99.1% Yield Run 1: Non-Ferrate Buffer (pH 10.5 Target, but Only Rising to 9.9)

HD + $2H_2O$ + $2HPO_4^{=}$ → thio diglycol 103% + $2H_2PO_4^-$ + unreacted HD 11%

Run 1: Water Reference (pH 2.1)

HD + $H_2O$ → thio diglycol 88% + unreacted HD 12%

Run 2: Ferrate Treatment (pH 7)

HD + xs $FeO_4^{=}$ → thio diglycol 22% + unreacted HD 20% + (LCNNTO) and/or inorganic mineralization 58%

Run 2: Non-Ferrate Buffer (pH 7 Target, Rising to 8.2)

HD + $2H_2O$ + $2HPO_4^{=}$ → thio diglycol 44% + unreacted HD 56% + $2H_2PO_4^-$ Run 3: Ferrate Treatment (pH 10.5 Target, Rising Only to 7.0)

HD + xs $FeO_4^{=}$ → thio diglycol 0.3% + unreacted HD 41% + divinyl sulfone 3.8% + (LCNNTO) and/or inorganic mineralization 54.9%

Run 4: Decontamination formulation 1.4 for treatment of VX with a large excess of potassium ferrate reagent at a pH of 7.0 using phase transfer catalyst.

A. To each of the three ferrate test sample vials, 750 mg of potassium phosphate monobasic and 50 μL of Aliquat® 336 phase transfer catalyst were added. The amount of VX shown in Table F4 was added, the vial capped and vortexed for 10 seconds; then 3 mL deionized water was added and the vial again vortexed for 10 seconds.

B. To each of the three reference test sample vials, 372 mg of potassium phosphate monobasic, 624 mg of dipotassium hydrogen phosphate trihydrate and 50 μL of phase transfer catalyst were added.

C. Three additional empty vials were reserved to be used as water blanks.

D. Finally, three vials were filled with approximately 281 mg of ~93% potassium ferrate crystals (260 mg of purity-adjusted material). These three vials were mixed with the contents of the ferrate test sample vials during the VX decontamination testing.

E. To each of the vials from step A were added the contents of ferrate vials from step D. The vials were immediately vortexed three times for 10 seconds each. After each 10 second vortex the vial was cracked open and checked for gas formation. Each vial was then placed in a multivial shaker and shaken for 60 minutes.

F. VX as shown in Table F-4 was added to each of the vials from steps B and C. The vials were vortexed for 10 seconds; then 3 mL deionized water was added and the vial again vortexed for 10 seconds. Finally the vials were placed in a multivial shaker for 60 minutes.

Decontamination Testing by FS GC-MS.

Per the procedures described above, 1.9 mg/mL of VX and a 45:1 mass ratio of ferrate to VX were used. All three ferrate treatments (samples FT-10, Fr-11, and FT-12) turned an orange color upon ferrate addition, heat was felt upon touch, and off gassing was heard when the vial cap was loosened. Upon shaking, all samples immediately turned a brown/orange color indicating that the ferrate reacted quickly. The non-ferrate buffer-only reference (samples pH-10, pH-11, and pH-12) became cloudy white after the final vortexing step and remained as such through the 60-min shaking period. The water-references (samples WR-4, WR-5, and WR-6) had slight foaming occur during the vortexing, but otherwise remained clear through all steps. The negative control (samples NC-4, NC-5, and NC-6) observations were identical to the ferrate treatments, except the color was kidney-bean brown upon ferrate addition indicating less reaction upon mixing, consistent with the lack of organic matter with which to react.

Quantitative Product Analyses of VX Reaction Mixtures with Ferrate by LC-MS-MS

VX was removed at a yield of 99.99±0.01% for the ferrate treatment (Table F-4, samples Fr-10, FT-1, and FT-12), which can be compared to the non-ferrate buffer-only reference samples (samples pH-10, pH-11, and pH-12) that only removed 65.8±4.1% of the VX, and to the water reference (samples WR-4, WR-5, and WR-6) that removed only 59.1±9.9%. Hence ferrate removes VX In essentially quantitative yield and with high precision at test conditions, while water and pH 7 buffer solution alone leave a substantial amount of VX after one hour of reaction time.

In addition, very important advantages of using ferrate emerge when considering the products formed in the decontamination reaction mixtures (Table F-4). With the ferrate treatment (samples Fr-10, Fr-11, and Fr-12), ethoxy methylphosphonic acid salt (ethoxy methylphosphonic acid) formation was detected in good reproducibility at a desirably high average concentration of 251.6±3.5 μg/mL, corresponding to a yield of 28.5±0.4%. Ethoxy methylphosphonic acid is a very desirable nontoxic stable compound as it is non-toxic and forms in lieu of EA-2192, the most undesirable highly toxic product often found with other decontamination chemistries. The non-ferrate buffer samples (pH-10, pH-11, and pH-12) averaged a low 75±6 μg/mL ethoxy methylphosphonic acid, corresponding to a yield of 8.5±0.7% conversion to ethoxy methylphosphonic acid, while water reference samples (WR-4, WR-5, and WR-6) was similar to non-ferrate buffer, averaging 63±6 μg/mL with only 7.1±0.7% conversion to ethoxy methylphosphonic acid. Ferrate treatment, non-ferrate buffer, and water alone were carried out at the same test conditions.

Critically, EA-2192 was completely absent in the ferrate treatment samples (FT-10, Fr-11, and Fr-12 of Table F-4). On the other hand, the non-ferrate buffer samples (pH-10, pH-11, and pH-12) and water reference samples (WR-4, WR-5, and WR-6) both produced some EA-2192, (14.6±1.0 μg/mL with a yield of 0.86±0.06% and 83.6±40.9 μg/mL with a yield of 4.9±2.4%, respectively). Lastly, all three test media (ferrate treatment, non-ferrate buffer, water reference) showed a small amount of formation of 2-(N,N-diisopropylamino) ethanol (2-N,N-diisopropylaminoethanol) with values of 1.9±0.5 μg/mL and a yield of 0.2±0.0%, 18±1 μg/mL and a yield of 1.7±0.1% and 16±1 μg/mL with a yield of 1.5±0.1%, respectively. The presence of 2-N,N-diisopropylaminoethanol indicates S—C bond cleavage occurrence without amine N oxidation or N—C bond breakage. It is noted that the ferrate samples showed only 10% of 2-N,N-diisopropylaminoethanol as does the reference and blank. This result is desirable, as N oxidation leads to toxic compounds, but the small amount present in all samples suggests that 2-N,N-diisopropylaminoethanol can be present as an impurity in the VX bulk material used for the testing. Alternatively, this nontoxic compound also can represent an intermediate in the overall reaction to LCNNTO compounds and/or mineralization.

TABLE F-4

VX Decontamination Product Results by LC-MS-MS Using Ferrate

| Sample Description | Sample ID | Run | Initial VX added (μg/mL) | Found VX by LC-MS-MS (μg/mL) | VX Removed by LC-MS-MS (%) | Maximum EMPA possible (μg/mL) | Found EMPA by LC-MS-MS (μg/mL) | Yield of EMPA (%) | Maximum DIPAE possible (μg/mL) |
|---|---|---|---|---|---|---|---|---|---|
| Ferrate Trt | FT-10 | 4 | 1903 | 0.345 | 99.98 | 883.4 | 247.6 | 28.0 | 1034.1 |
| Ferrate Trt. | FT-11 | 4 | 1903 | <0.03 | >99.99 | 883.4 | 252.9 | 28.6 | 1034.1 |
| Ferrate Trt. | FT-12 | 4 | 1903 | <0.03 | >99.99 | 883.4 | 254.2 | 28.8 | 1034.1 |
| | | | Average→ | 0.135 | 99.99 | | 251.6 | 28.5 | |
| | | | Std Dev→ | 0.182 | 0.005 | | 3.5 | 0.4 | |
| pH 7 Ref | PH-10 | 4 | 1903 | 561.6 | 70.49 | 883.4 | <75 | 8.5 | 1034.1 |
| pH 7 Ref | PH-11 | 4 | 1903 | 688.2 | 63.84 | 883.4 | 77.1 | 8.7 | 1034.1 |
| pH 7 Ref | PH-12 | 4 | 1903 | 703.2 | 63.05 | 883.4 | 80.4 | 9.1 | 1034.1 |
| | | | Average→ | 651.0 | 65.80 | | 78 | 8.8 | |
| | | | Std Dev→ | 77.8 | 4.09 | | 2.7 | 0.3 | |
| Water Ref | WR-4 | 4 | 1903 | 563.4 | 70.40 | 883.4 | <75 | 8.5 | 1034.1 |
| Water Ref | WR-5 | 4 | 1903 | 911.1 | 52.13 | 883.4 | <75 | 8.5 | 1034.1 |
| Water Ref | WR-6 | 4 | 1903 | 862.2 | 54.70 | 883.4 | <75 | 8.5 | 1034.1 |
| | | | Average→ | 245.9 | 59.08 | | 75 | 8.5 | |
| | | | Std Dev→ | 188.2 | 9.89 | | 0.0 | 0.0 | |

TABLE F-4-continued

VX Decontamination Product Results by LC-MS-MS Using Ferrate

| Sample Description | Sample ID | Run | Initial VX added (μg/mL) | Found DIPAE by LC-MS-MS (μg/mL) | Yield of DIPAE (%) | Maximum EA-2192 possible (μg/mL) | Found EA-2192 by LC-MS-MS (μg/mL) | Yield of EA-2192 (%) |
|---|---|---|---|---|---|---|---|---|
| Ferrate Trt | FT-10 | 4 | 1903 | <0.15 | 0.015 | 1703.4 | ND | 0 |
| Ferrate Trt. | FT-11 | 4 | 1903 | <0.15 | 0.015 | 1703.4 | ND | 0 |
| Ferrate Trt. | FT-12 | 4 | 1903 | <0.15 | 0.015 | 1703.4 | ND | 0 |
| | | | Average→ | <0.2 | 0.015 | | ND | 0 |
| | | | Std Dev→ | 0.0 | 0.0 | | NA | NA |
| pH 7 Ref | PH-10 | 4 | 1903 | 17.04 | 1.6 | 1703.4 | 13.95 | 0.82 |
| pH 7 Ref | PH-11 | 4 | 1903 | 19.38 | 1.9 | 1703.4 | 15.78 | 0.93 |
| pH 7 Ref | PH-12 | 4 | 1903 | 16.71 | 1.6 | 1703.4 | 14.07 | 0.83 |
| | | | Average→ | 17.71 | 1.7 | | 14.60 | 0.86 |
| | | | Std Dev→ | 1.5 | 0.1 | | 1.0 | 0.06 |
| Water Ref | WR-4 | 4 | 1903 | 14.52 | 1.4 | 1703.4 | 38.28 | 2.25 |
| Water Ref | WR-5 | 4 | 1903 | 16.98 | 1.6 | 1703.4 | 118.02 | 6.93 |
| Water Ref | WR-6 | 4 | 1903 | 15.90 | 1.5 | 1703.4 | 94.35 | 5.54 |
| | | | Average→ | 15.80 | 1.5 | | 83.55 | 4.90 |
| | | | Std Dev→ | 1.23 | 0.1 | | 40.95 | 2.40 |

ND: Non-detect

NA: Not Applicable

Std Dev: Standard Deviation

Note:

For cases where sample triplicates contained a "<XX" or ">XX", a value of "XX" was used in order to carry out calculations, as seen with FT-10, FT-11, and FT-12 for VX)

The VX samples treated with ferrate contained about 15% of the amount of 2-N,N-diisopropylaminoethanol shown to be in the buffer and water reference systems. This quantified difference indicates that ferrate significantly decontaminations this component of VX mixtures.

Chemical Equations for VX Decontamination using Ferrate Based on the results given above, the unbalanced chemical reaction for VX decontamination using ferrate is summarized by the following equation (unbalanced):

Run 4: Ferrate Treatment of VX at pH 7

$$VX + xs\ FeO_4^{=} \longrightarrow \underset{28.5\%}{\text{ethoxy methylphosphonic acid}} + \underset{0.2\%}{\text{2-N,N-diisopropylaminoethanol}} + \underset{71.3\%}{\text{LCNNTO and/or inorganic mineralization}}$$

(with no generation of EA-2192, < 0.002%)

The structure and probable formation route of EA-2192 is found below:

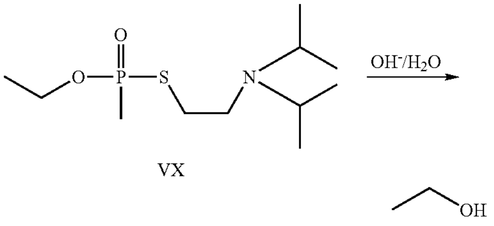

VX

+

-continued

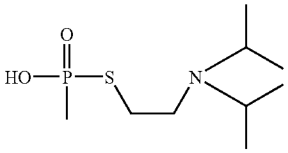

EA 2192

The above results allow a number of key conclusions to be drawn regarding the use of ferrate as a decontamination reagent formulation against HD and VX:

Ferrate was found to be dramatically effective in the quantitative (99+%) decontamination of these agents when used in the manner of Run #1. Qualitative indications, based on rate of ferrate color disappearance, suggest that the decontamination reaction is fast.

Critically, this decontamination is accomplished while not forming toxic organic products found with other decontamination chemistries, though such products were formed in the reference and blanks cases.

Apparently, the toxic products that form with conventional hydrolysis treatments of water and alkaline pH, in the absence of ferrate, either do not have time to form when ferrate decontamination reagent is present, or do form and are destroyed rapidly by ferrate, or both occur.

Ferrate accomplishes substantial decontamination of HD and VX into small low carbon number non-toxic organic (LCNNTO) compounds and/or inorganic salts (mineralization) when a large ferrate/agent ratio (e.g., 22.5 or 45 respectively) is used. Essentially full oxidation of agents is reasonable thermodynamically given the high oxidation potential and kinetic reactivity of ferrate and given the sufficiently high ferrate/agent ratio used.

The thermal stability of the active decontamination component, potassium ferrate, was determined in replicated testing to be excellent in simulated AR 70-38 (up to 71° C.) hot/dry protocols, with little or no losses occurring over long periods, at least 98- and 82 days for isothermal (at 71° C.) and temperature cycling testing, respectively. The thermal testing was stopped with the potassium ferrate still active.

The results of the thermal stability testing of potassium ferrate indicate that $K_2FeO_4$ TG crystals are quite stable. Thermal stability has been a serious barrier to commercialization of the otherwise desirable peroxide decomposition chemistry. It is surmised that the ferrate ion, $FeO_4^{=}$, tetrahedral (Td) structure, being almost identical to that of the highly symmetrical sulfate ion, $SO_4^{=}$, figures into causing the observed high solid state stability of ferrate ion. Like potassium sulfate, potassium ferrate is extremely water soluble and dissolves rapidly, enabling a strongly reacting decontamination agent to be readily prepared at the point of use, with only a small amount of water needed, and from a stable solid product.

One embodiment of the invention provides for a procedure to decontaminate HD or VX, and many other chemical and biological agents, with ferrate. The contaminated surface can be treated with a sufficient excess ferrate in two steps at ambient temperature;

Step 1: Apply ferrate as a powder or a thin layer of liquid (Part 1).

Step 2: Apply a buffer/phase transfer catalyst mixture as a powder or water mist (Part 2).

Let stand until discoloration occurs (from purple to orange-brown). Rinse to non-hazardous sewer (optional), or sweep up to non-hazardous waste disposal (optional), or let stand, depending on the nature of the surface contaminated.

In another embodiment, the ferrate could be mixed with the buffer and/or phase transfer catalyst before application and then applied in one step.

Both application procedures allow the pH to drift downwards during the treatment but the pH is always at mild values to prevent corrosion of the surface being treated, and to provide a full range of oxidation strength and other ferrate-driven decontamination reactions to occur. The buffer, or equivalent, provides the means to prevent the pH from entering a hazardous or corrosive region for the surfaces being decontaminated.

Bis-Quaternary Ammonium Salt of Ferrate

Another broad embodiment of the invention includes a decontamination composition of $(R_1R_2R_3R_4N)_2FeO_4$ and a carrier. The carrier is typically water but may be any carrier that is substantially oxidation resistant to ferrate. To be substantially oxidation resistant to ferrate the carrier should be able to substantially resist oxidation for at least 3 hours at the conditions for use. The carrier may be a liquid, a powder, or a gas. A typical and very useful carrier comprises water. When a powder or a gas is the carrier, the carrier may also include a hygroscopic compound such as hygroscopic anhydrous and hydrated compounds of lithium, sodium, potassium, tetraammonium and other quaternary amine, salts of the anions: hydroxide, orthophosphate tribasic, nitrate, molybdate, periodate, perchlorate, acetate, perchlorate, carbonate, phosphate monobasic, phosphate dibasic, pyrophosphate, citrate, fluoride, disulfate, silicate, methane sulfonate, methyl sulfate, and/or oxide, and the like. The quaternary amine is typically selected from the group $R_1,R_2,R_3,R_4N^+$ where R=alkyl and/or aryl, and wherein the "R" groups can represent cyclic structures, or form cyclic structures with two "R" groups, and where the total carbon number for the compound is at least 4. In some embodiments, two "R" groups may form an aliphatic ring and one or two rings may be present per nitrogen. The aliphatic rings or "R" groups may have branches including an aliphatic group that add to oxidative stability.

The quaternary amine ferrate is produced by making a concentrated solution of $K_2FeO_4$, then adding a quaternary ammonium hydroxide to the solution, where both are cooled so as to minimize any unwanted oxidation reactions. The mixture is stirred and may be cooled further. A precipitate of quaternary ammonium ferrate is obtained. The precipitated product is separated from the solution, typically by filtration, and dried for use.

Desulfurization of Crude Oil, Coal, Natural Gas and their Products Using Ferrate(VI)

Chemical processing of extractive energy sources such as crude oil, coal, and natural gas to produce important commercial products requires the removal of sulfur and other detrimental contaminants to improve production process performance and final product purity and cost/performance. Typical sulfur content of fuels is up to about 7 wt % for Kentucky coal; in addition Illinois and Ohio coals are also known to be high in sulfur. Crude oil is known to have up to about 8 wt % sulfur. It has now been discovered that ferrate(VI), or just "ferrate" an oxidant with attractive properties for removing the sulfur species from fuels such as petroleum and coal and the downstream products (gasoline, diesel fuel, JP-8, propane, heating oil, etc.) by oxidation treatment with an aqueous solution containing ferrate(VI) and a phase transfer catalyst, for example quarternary ammonium ion or phosphonium ion, preferably N-methyl tri(octyl)ammonium. The oxidized sulfur species is then removed from the oil phase using known techniques such as liquid/liquid extraction using a methanol, acetonitrile, or aqueous phase, or other appropriate extraction processes. For natural gas, the gas phase can be sparged up through an aqueous solution of ferrate, preferably caustic ferrate(VI) solution, to provide oxidation of the sulfur species contained therein, e.g. mercaptans, hydrogen sulfide, elemental sulfur, and the like. Alternatively, a spray curtain may be used through which the gas flows. The use of a caustic solution, preferably caustic soda solution, of ferrate allows regeneration of the ferrate in-situ, and requires a purge to control oxidized sulfur (e.g. sulfate) levels. In addition to sulfur removal, the above methodology simultaneously removes complexed metal ions contained in the oil or fuel, thereby providing a second benefit as these metal ions also hamper catalyst activity. Other contaminant species, such as amines, can also be removed. Notably the oxidation of the sulfur species occurs at relatively mild conditions from about −32° C. to about 100° C., preferably from about 10° C. to about 90° C., and most preferably from about ambient (about 20° C. to about 50° C. At these temperatures the reaction appears selective for the sulfur or nitrogen containing compounds so that the remainder of the fuel is spared substantial oxidative attack by the ferrate. Metal ions are typically removed by attack of the ferrate on organics that sequester the metal (e.g. metal in a porphyrin ring). The latter aids in membrane poisoning removal. Overall the process provides that the fuel source containing nitrogen, sulfur, or metals does not have negative effects on downstream processes. Natural gas and coal can typically be treated by liquefaction followed by ferrate oxidation.

For removal of sulfur containing compounds, removal of nitrogen containing compounds and removal of metals, the phase transfer catalyst is typically oil soluble and not surface or interfacially active. This contrasts to a "surfactant' that is surface active and interfacially active. This is because a clean phase break is desired for the fuel and water, or caustic electrolyte. Other carriers include those described elsewhere herein.

One embodiment of the invention utilizes an aqueous solution of ferrate and a phase transfer catalyst (designated as [O] in the exemplary equations below) to oxidize sulfur compounds in petroleum crude and petroleum products to species which can be easily extracted via the appropriate extraction or wash technology. The aqueous solution is typically mixed with the oil phase and allowed to react for an appropriate amount of time sufficient to allow ferrate anion transport with the phase transfer catalyst and for the intrinsic sulfur oxidation reaction to occur, with at least a portion of the organo sulfur compounds oxidized, e.g. for dibenzothiophenes (DBTs) and benzothiophenes (BTs).

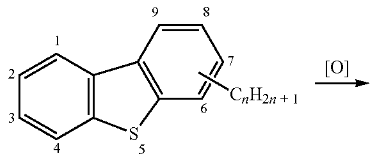

(0 ≤ n ≤ 6)

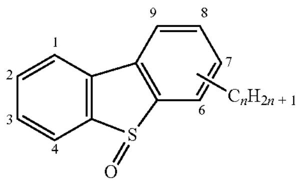

or/and

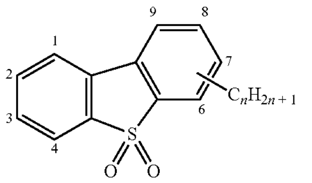

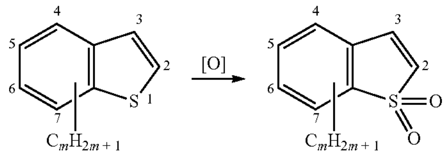

(0 ≤ m ≤ 6) (0 ≤ m ≤ 6)

or/and

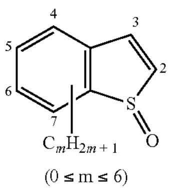

(0 ≤ m ≤ 6)

This reaction mechanism has been demonstrated for chemical warfare agent sulfur compounds (see the disclosure above). The resulting sulphoxide and sulphones are then readily removed from the oil or liquid fuel phase via liquid/liquid extraction with methanol or other appropriate polar solvent.

For the case of natural gas, contaminants such methyl mercaptan, dimethyl sulfide, and the like are oxidized to sulfoxides, sulfones, and/or sulfate by scrubbing the natural gas with ferrate, phase transfer catalyst or emulsifier, and buffer solution, for example by using a spray tower contactor or percolation bed.

Typical applications of the invention include:

(1) Removal of sulfur from petroleum oil prior to distillation and cracking of the oil. Most preferred, is to couple this oxidative treatment in conjunction with the conventional initial aqueous wash process (Kirk-Othmer) to significantly reduce capital and operating costs of new or existing refineries. In a major advantage, the removal of sulfur from feedstock prior to distillation provides the opportunity to utilize far cheaper alloys as materials of construction. Hydrotreating can still be utilized after oxidation because of other benefits, but with less hydrogen consumption and especially with much longer catalyst service life due to the prior removal of sulfur. Lower temperature of operation is an added benefit.

(2) Removal of sulfur from a particular distilled/processed petroleum product, e.g. diesel fuel, JP-8, etc. Environmental regulations are projected to become even more stringent soon for sulfur levels in fuels, and new technologies are needed to provide these lower sulfur levels in petroleum products.

Some embodiments of the invention find application to produce very low residual sulfur fuels that could be used to meet these regulations, and to be used with fuel cells, which are particularly sensitive to sulfur contamination. In addition, desulfurization of fuels with the present invention can solve petroleum product contamination issues associated with pipeline transmix, tanker transmix, general contamination, high sulfur production batches, and the like.

(3) Removal of sulfur from naphtha or other petrochemical feedstock before downstream processing, e.g. cracking, reforming, etc.

(4) Ferrate can also co-remove toxic metal ion contaminants along with the sulfur, for example Hg, Pb, V, and Ni by oxidation and coagulation/precipitation reactions.

A series of tests were made to demonstrate the ability of phase transfer agents to solubilize ferrate(VI) into toluene. The toluene is representative of a fuel (e.g. diesel oil, kerosene, heating oil, and the like) or oil soluble chemical warfare agent.

1. When solid ferrate(VI) was added to toluene substantially none of the ferrate went into solution in the toluene (toluene remained clear and colorless).

2. When solid ferrate(VI) and aqueous buffer at pH 7.2 were added to the toluene substantially none of the ferrate went into solution in the toluene (toluene remained clear and colorless), however, ferrate went into solution in the buffer (buffer changed color).

3. When solid ferrate(VI) and phase transfer catalyst (Aliquat™ 336) were added to the toluene, substantially none of the ferrate went into solution in the toluene (toluene remained clear and colorless).

4. When solid ferrate(VI), phase transfer catalyst (Aliquat™ 336), and aqueous buffer at pH 7.2 were added to the toluene all of the toluene layer changed color indicating that ferrate had gone into solution in the toluene.

Jet Fuel Used

Mansfield JP-8 (Test Fuel 2)

Total S—438.1 ppm

Density—0.8055 g/mL

Test fuel sulfur content and density were determined using ASTM methods D5453 and D-4052, respectively.

Example S-1

This example illustrates initial Mansfield JP-8 oxidation tests. A summary of results for eight Mansfield JP-8 samples is presented below.

TABLE S-1

| Sample Information | | | | | |
|---|---|---|---|---|---|
| Sample No. | Sample Description* | Sample Type | pH | Shake Time (min) | Fuel Color |
| 7-7 | JP-8, ferrate, PTC | Oxidized | — | 60 | Tea |
| 7-22 | JP-8, DI $H_2O$ | Control | — | 1 | |
| 7-30 | JP-8, DI $H_2O$, ferrate, PTC | Oxidized | — | 60 | Tea |
| 8-6 | JP-8, DI $H_2O$, $NaHCO_3$, NaOH, PTC | Control | 10.5 | 60 | |
| 8-17 | JP-8, DI $H_2O$, $KH_2PO_4$, ferrate, PTC | Oxidized | 10.5 | 60 | Coffee |
| 9-5 | JP-8, electrolyte (44% NaOH) | Control | 14 | 1 | |
| 9-12 | JP-8, electrolyte, ferrate | Oxidized | 14 | 5 | Slight yellow |
| 9-21 | JP-8, electrolyte, ferrate, PTC | Oxidized | 14 | 60 | Deep brown |

In the sample description DI $H_2O$ is deionized water, PTC is phase transfer catalyst.
The mole ratio of ferrate to sulfur is about 5.4:1.

PFPD Results

Overlays of the chromatograms of samples 7-30, 9-12 and 9-21 with their controls indicated no effects of ferrate on the samples. 7-7 was overlaid with 7-30 for a comparison and also indicated no changes. Also, based on overall sample response on the DB-5 GC column there was no significant difference between these four samples.

However, 8-17 displayed prominent differences compared to its control, sample 8-6. Essentially no peaks were present in the 25 min to 46 min time range. From 46 min to 54 min most of the peaks in 8-17 were reduced or eliminated except for one major peak at approximately 43 min which increased. From 54 min to 70 min 8-17 displayed an increase in peaks and an increase in unconsolidated complex material (UCM). The observed signal increase later in the gas chromatography analysis is consistent with the oxidation of sulfur compounds creating higher boiling point material.

GC×GC/MS Results

Based on the results from the PFPD analysis sample 8-17 was closely examined. The following observations were made:

Complete loss of dibenzothiophene very likely but no obvious oxidation product(s) found. They may be too polar to chromatograph well. Reduction in some of the substituted benzothiophenes. The loss is generally ~10%. Again, oxides or dioxides were not observed.

In general, this example illustrates that buffer enhances the oxidation sulfur compounds in a fuel. The buffer helps assure that the ferrate is protonated so as to promote a better reaction.

Example S-2

This example illustrates ferrate dose testing for a range of ferrate concentrations. Oxidation tests were performed with different molar ratios of ferrate to total sulfur using Test Fuel 2, the Mansfield JP-8 jet fuel. The optimum reaction conditions from the previous oxidation study were used for all samples. Table S-2 provides summary information for the prepared samples.

TABLE S-2

| Sample information for ferrate dose tests. | | | |
|---|---|---|---|
| Sample # | Sample Description | Mol Ratio (Ferrate:Sulfur) | Analysis |
| 11-04 | JP-8 Control | N/A | GC/PFPD |
| 11-21 | Oxidized JP-8 | 5.4:1 | GC/PFPD |
| 11-17 | Oxidized JP-8 | 10.8:1 | GC/PFPD |
| 11-18 | Oxidized JP-8 | 21.7:1 | GC/PFPD |
| 11-19 | Oxidized JP-8 | 43.3:1 | GC/PFPD |
| 11-20 | Oxidized JP-8 | 54.2:1 | GC/PFPD |
| 11-29 | Oxidized Sulfur Compound Mix | 54.2:1 | GC/MS |

GC/PFPD = gas chromatography/pulsed flame photometric detection
GC/MS—gas chromatography/mass spectrometer
N/A—not applicable GC/PFPD Results Similar oxidation results were observed for all oxidized JP-8 samples as previously observed. Early eluting sulfur compounds present in the control sample were reduced or absent in the oxidized samples. Later eluting, presumably oxidized, sulfur species that were absent in the control sample were present in the oxidized samples. All tested molar ratios showed similar results, however ratios of 10.8:1, 21.7:1, and 43.3:1 contained almost no peaks in the 25 to 46 minute time window on the DB-5 GC column. The 5.4:1 and 54.2:1 samples did not show as complete a removal of sulfur compounds in this window. This variation in results may be due to slight differences in sample preparation.

GC/MS Results

Sample 11-29 was prepared to evaluate how known sulfur compounds react with the ferrate. This sample contained a total of 23 sulfur compounds plus dibenzothiophene. All compounds were present in solution at a concentration of 17 μg/mL except for dibenzothiophene which was present at 25 μg/mL. Analysis of the sample by GC/MS revealed a large number of organic compounds at high concentration that may be associated with the phase transfer catalyst as chemical impurities. These impurities precluded a comprehensive analysis of the sample for the presence oxidized sulfur compounds. Of note was the almost complete reduction in benzothiophene and dibenzothiophene in the oxidized sample as compared to an aliquot of the unoxidized sample. Desirably, oxidized species of benzothiophene and dibenzothiophene could not be found in the sample.

Solvent Extraction of Oxidized JP-8

Samples of Mansfield JP-8 fuel was oxidized using an 21.7:1 molar ratio of ferrate to sulfur. Oxidized samples were extracted two times with methanol or two times with acetonitrile. An aliquot of extracted fuel from each extraction and extraction solvent were saved for analysis.

Solvent extraction of oxidized JP-8 was very successful for removing sulfur compounds. The sample of 21.7 molar ratio of ferrate:JP-8 appeared to oxidize more of the early eluting sulfur compounds compared to this latest set of data. The 1× acetonitrile extraction of oxidized JP-8 removed a substantially greater % of oxidized material than the 2× acetonitrile extraction of oxidized JP-8. The 2× acetonitrile extraction compared well with both methanol extractions. The 2× acetonitrile extraction and 2× methanol extraction of oxidized JP-8 appear very similar with the acetonitrile extracted sample containing slightly less sulfur compounds. Sulfur compounds were significantly reduced in the oxidized JP-8 following solvent extraction when compared to JP-8 that was simply solvent extracted. See Table S-3.

TABLE S-3

Total sulfur percentage compared to unaltered jet fuel.

| Sample | Sample | Total S Area (%) |
|---|---|---|
| | Jet Fuel | 100 |
| 16-8 | Oxidized Jet Fuel | 94 |
| 16-13 | 1st MeOH Ext. | 15 |
| 16-21 | 2nd MeOH Ext. | 9 |
| 17-8 | Oxidized Jet Fuel | 87 |
| 17-13 | 1st ACN Ext. | 22 |
| 17-21 | 2nd ACN Ext. | 8 |
| 18-8 | Control Jet Fuel | 102 |
| 18-13 | 1st MeOH Ext. | 69 |
| 18-21 | 2nd MeOH Ext. | 51 |
| 19-8 | Control Jet Fuel | 100 |
| 19-13 | 1st ACN Ext. | 55 |
| 19-21 | 2nd ACN Ext. | 49 |

MeOH Ext.—methanol extraction
ACN Ext. acetonitrile extraction

Suitable extractants as alternatives to methanol and acetonitrile are nonaqueous solvents with a high molecular dipole moment. Examples of such extraction solvents are ethanol, propanonitile, tetrahydrofuran, propylene carbonate, N-methyl pyrrolidene, dimethyl sulfoxide, dimethyl carbonate, nitromethane, dimethyl sulfate, nitrobenzene, sulfolane, trioxane, dimethylformamide, acetic acid, and the like, as well as mixtures thereof. Typical molar ratios of contaminants to extractant are typically 1:1 to 20:1

Example S-3

This example illustrates the preparation of Aliquat-336 phase transfer catalyst:

Added approximately 20 mL of Aliquat® 336 (Sigma-Aldrich #205613-250 ML) to a Teflon separatory funnel. To this funnel was added 100 mL of 10% (w/w) $H_2SO_4$. The funnel was capped and shaken well. The phases were allowed to separate and the acid phase was removed and discarded. This acid washing was repeated nine more times. After the final acid wash was removed, 100 mL of high purity deionized water was added to the funnel containing the acid-washed Aliquat® 336. The funnel was capped and shaken well. The phases were allowed to separate, then the water phase was drained and discarded. This water rinsing was repeated nine more times. The pH of the water phase was measured during draining by pH paper. The pH of the final water rinse was found to be approximately 2.5. Added an additional portion of high purity deionized water to the funnel, and then added 1 N NaOH dropwise with shaking until the pH of the water phase was approximately between 5.5 and 6.0 (by paper). Drained away the water phase and discarded. Centrifuged the Aliquat® 336 for 10 minutes at approximately 2230 rpm, removed and discarded any remaining water and then transferred to a plastic bottle until ready for use.

Example S-4

This example illustrates JP-8 Sulfur Reduction by oxidation using potassium ferrate, and phase transfer catalyst prepared as in Example S-3:

To a clean 20-mL glass vial, added 191.6 mg of potassium phosphate, monobasic ($KH_2PO_4$). To this vial was added 50 μL of prepared Aliquat® 336 (see procedure outlined above). Then 3 mL of high purity deionized water was added to this vial, which was then capped and shaken by hand for approximately one minute. Then 6 mL of JP-8 fuel was added to the vial followed by 393.5 mg of 90.4±0.3% (number of samples n=3) potassium ferrate ($K_2FeO_4$). The vial was immediately capped and shaken by hand for approximately one minute with periodic venting. The vial was then transferred to a shaker table where it was mixed vigorously for one hour. After mixing, the vial was centrifuged for 15 minutes at approximately 2230 rpm. The top (JP-8) phase was removed and further extracted with methyl alcohol to remove oxidized sulfur and/or nitrogen compounds.

Example S-5

This example provides a comparison of Unaltered JP-8 to Oxidized JP-8. Unaltered JP-8 jet fuel was compared to JP-8 that had undergone oxidation with ferrate following the procedure described herein.

A gas chromatograph (GC) with a pulsed flame photometric detector (PFPD) was used to analyze samples of JP-8 jet fuel. The PFPD was optimized to detect only organic compounds containing sulfur. An 89 minute GC analysis time with a slow GC oven ramp rate was used to improve resolution of sulfur compounds.

Figure 4:
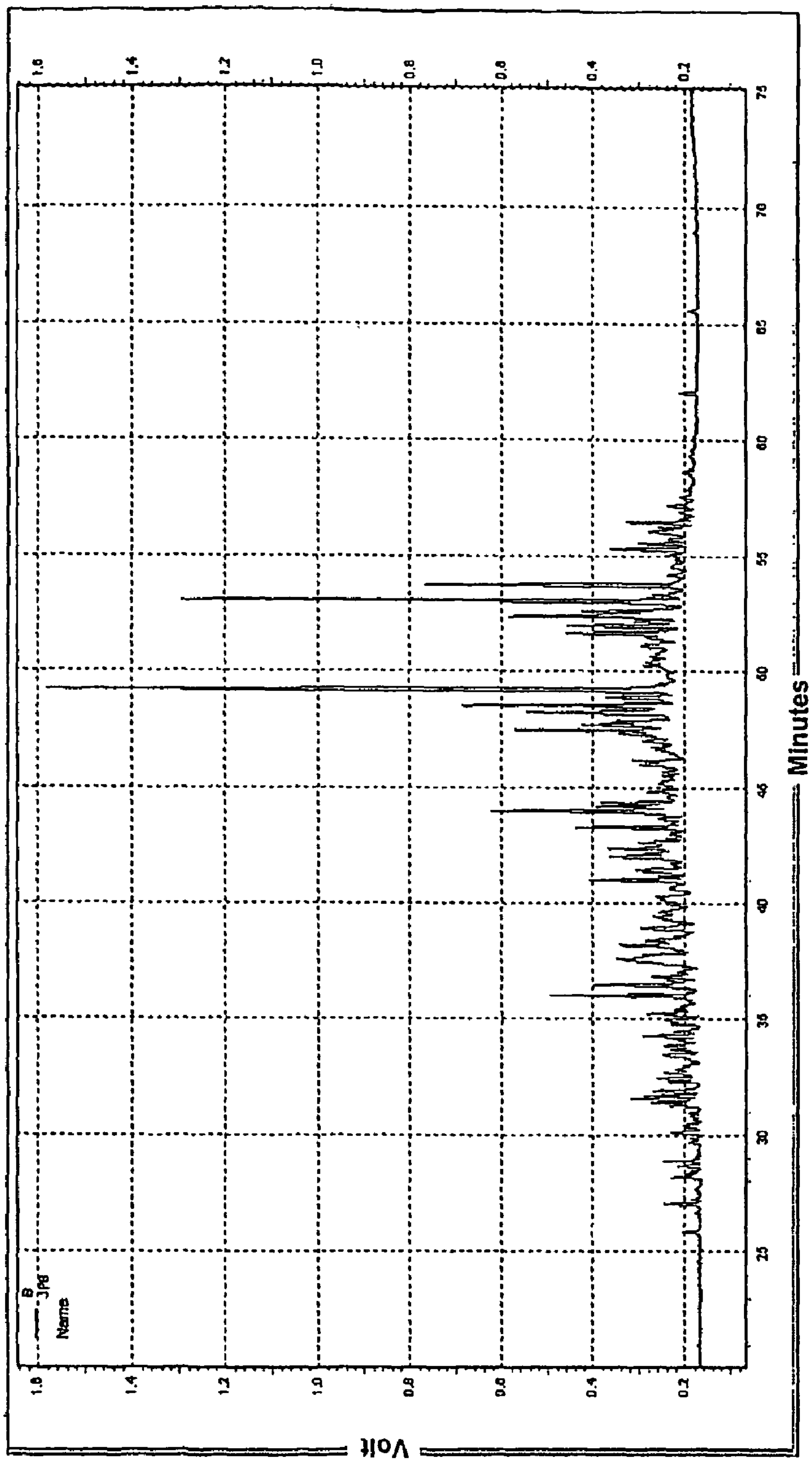
FIG. 4 is a chromatogram of JP-8 jet fuel showing a GC/PFPD (gas chromatograph/pulsed flame photometric detector) analysis of the fuel as supplied before treatment with ferrate.

The JP-8 jet fuel containing 443 ppm of total sulfur, as determined by ASTM D5453, was selected for evaluation. GC/PFPD analysis of this JP-8 resulted in the chromatogram shown in FIG. 4. The JP-8 was not diluted prior to analysis but was injected with a 100:1 split. Greater than 270 separate peaks were present in this chromatogram.

Comparison of the JP-8 chromatogram to the retention times of known compounds analyzed under the same GC conditions indicated that the earlier eluting compounds, in the 25 minute to 45 minute time frame, were probably long chain disulfides, thiols and dithiols. Later eluting compounds were likely alkyl substituted benzo(b)thiophenes. The latest eluting compound was dibenzothiophene.

Oxidation of the JP-8 jet fuel using the procedure described here should result in the conversion of sulfur compounds to oxidized species such as sulfoxides and sulfones. Upon oxidation these sulfur compounds increase in boiling point i.e. the oxidized species have a higher boiling point than the unoxidized species. Because the gas chromatographic analysis utilized here separates compounds based on boiling point higher boiling point compounds have longer retention times. Therefore any oxidation of sulfur compounds should be evident from increased retention times.

Figure 5:
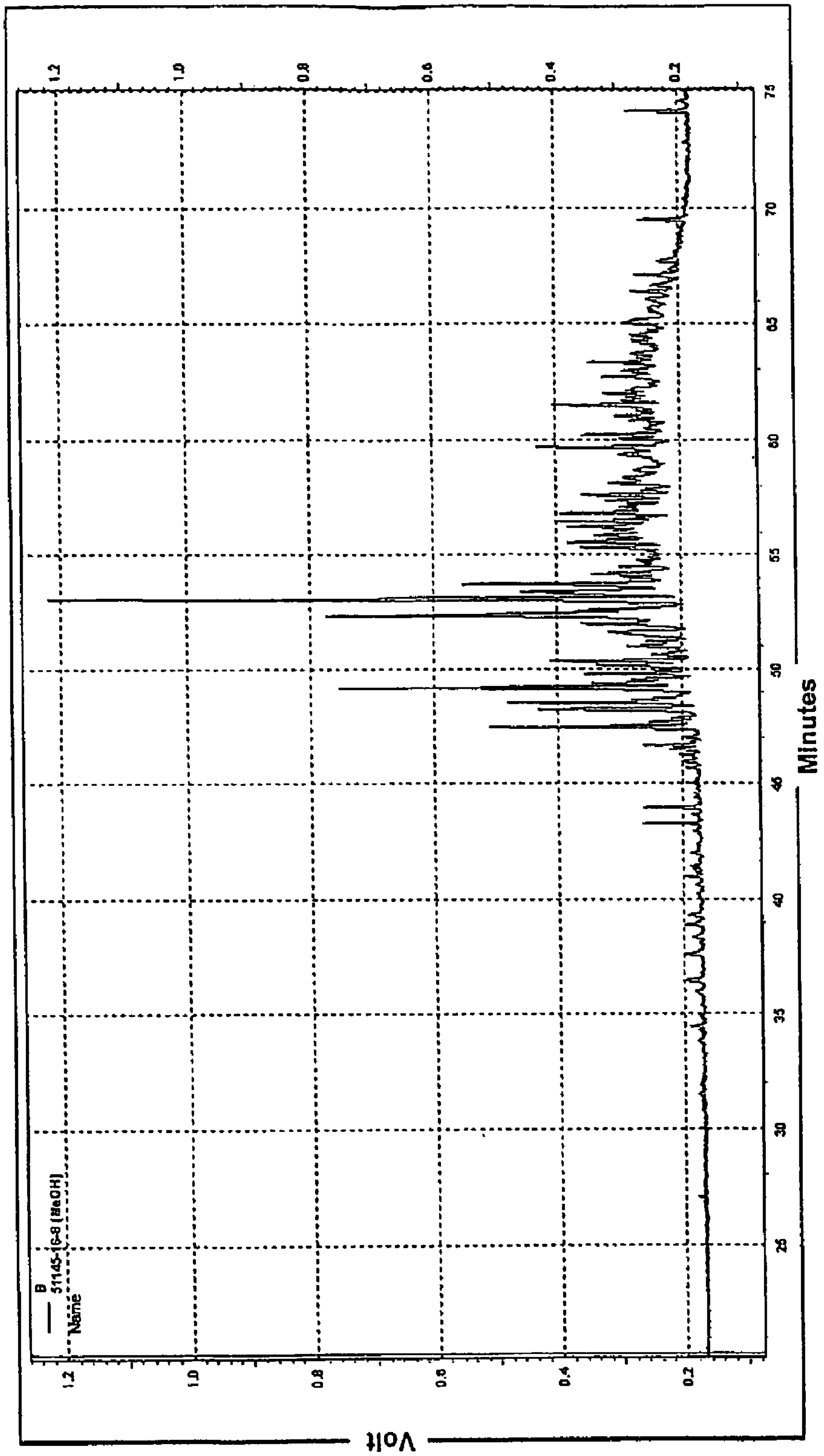
FIG. 5 is a chromatogram of JP-8 jet fuel showing a GC/PFPD (gas chromatograph/pulsed flame photometric detector) analysis of the fuel after oxidation, hydrolysis and neutralization treatment with ferrate.

The analysis of JP-8 jet fuel that had been oxidized resulted in the chromatogram shown in FIG. 5. Identical GC/PFPD conditions were used for both samples displayed in FIGS. 4 and 5. The oxidized JP-8 was not diluted prior to analysis but was injected with a 100:1 split. The oxidized JP-8 in FIG. 5 displayed a dramatic change in profile compared to the chromatogram of unaltered JP-8 in FIG. 4.

Two changes in the chromatographic profile of the oxidized JP-8 were considered. The first change was the almost complete loss of sulfur compounds eluting between 25 minutes and 45 minutes. As noted above these compounds were likely disulfides and thiols which should have been easily oxidized by the ferrate. The second change was the appearance of sulfur compounds eluting after 60 minutes and an increased response for compounds eluting between 55 minutes and 60 minutes.

These observations correlated well with the predicted gas chromatographic behavior discussed above. The lower boiling point thiols and disulfides, normally eluting between 25 minutes and 45 minutes, were oxidized by reaction with ferrate creating new, oxygen containing compounds. The higher boiling point of these oxygen containing compounds resulted in later elution times, after 55 minutes. This explains the loss of the early eluting compounds and the appearance of the later eluting compounds in the oxidized JP-8.

Oxidation of Benzo(b)thiophene and Dibenzothiophene

As noted above sulfides and thiols should undergo oxidation readily using the ferrate reaction conditions described here. Compounds such as substituted benzo(b)thiophenes and substituted dibenzothiophenes have been shown to be far more recalcitrant to oxidation. A study was devised to evaluate the ability of ferrate to oxidize benzo(b)thiophene and dibenzothiophene.

A hexane solution was prepared containing benzo(b) thiophene and dibenzothiophene at concentrations of 17 μg/mL and 25 μg/mL, respectively. This solution was oxidized following the ferrate oxidation procedure described here.

A GC with a mass selective detector (MSD) was used to analyze for the presence of benzo(b)thiophene and dibenzothiophene. Samples of both the unoxidized hexane solution and the oxidized solution were analyzed. The GC/MSD system was operated in the full scan mode. An 80 minute GC analysis time with a slow GC oven ramp rate was used. Both benzo(b)thiophene and dibenzothiophene were identifiable in the samples by comparison of their mass spectra to mass spectra of these compounds contained In the NIST 04 mass spectral library.

The abundance of benzo(b)thiophene in the unoxidized solution was compared to the abundance in the oxidized solution. An extracted ion chromatogram of ion 134 for both samples displayed a peak for benzo(b)thiophene at a retention time of 37.69 minutes in the unoxidized solution and another chromatogram displayed the peak for benzo(b)thiophene at a retention time of 37.67 minutes in the oxidized solution. Comparing the integrated area of the peak in each sample a 97% reduction in benzo(b)thiophene was attributed to oxidation.

The abundance of dibenzothiophene in the unoxidized solution was compared to the abundance in the oxidized solution. An extracted ion chromatogram of ion 139 for both samples was compared. One chromatogram displayed the peak for dibenzothiophene at a retention time of 62.64 minutes in the unoxidized solution and the other chromatogram in displayed the peak for dibenzothiophene at a retention time of 62.65 minutes in the oxidized solution. Comparing the integrated area of the peak in each sample a 97% reduction in dibenzothiophene was attributed to oxidation.

Following the oxidation step the oxidized compounds are extracted as discussed earlier.

The above results show that sulfur compounds can be effectively removed from a fuel such as jet fuel. Based on these results it is expected that nitrogen compounds and metal containing compounds can similarly be oxidized and the nitrogen and metals extracted.

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit of the scope of the invention.

We claim:

1. A decontamination formulation comprising:

a ferrate(VI) compound;

a phase transfer catalyst; and a pH buffer for controlling the pH to be within a range of about 3 or higher.

2. The formulation of claim 1, wherein the phase transfer catalyst is a cationic oxidation resistant phase transfer catalyst, and wherein the cationic phase transfer catalyst is selected from the group of quaternary ammonium compounds and/or organic phosphonium compounds.

3. The formulation of claim 2 where the quaternary ammonium compound is N-methyl tri-octyl ammonium ion.

4. The formulation of claim 2 wherein the quaternary ammonium compound is selected from the group $(R_1R_2R_3R_4)N^+$ where R=cyclic structure, alkyl and/or aryl, and where the total carbon number for the compound is at least 4.

5. The formulation of claim 2 where the quaternary ammonium compound is selected from quaternized polyamines, where two of the $R_1$, $R_2$, $R_3$, or $R_4$ groups are polymer chains and where the other two are alkyl and/or aryl, and where one or more of these "R" groups are represented by cyclic structures.

6. The formulation of claim 2 where the phosphonium is selected from the group $R_1R_2R_3R_4P^+$ where R=alkyl and/or aryl and where one or more of the "R" groups are represented by cyclic structures, and where the total carbon number for the compound is at least 4.

7. The formulation of claim 4 where the $R_4$ is a lower alkyl group of 1 to 6 carbons, and $R_1$, $R_2$, and $R_3$ are represented by cyclic structures, aryl and/or aromatic, including pyridine, N-alkyl piperidine, N-alkyl pyrrolidine, N,N-dialkylated aniline, N,N'-alkylated piperazine, N-alkyl(1-phenylpiperazine), N,N,N',N'-tetraethyl hexamethylene diamine, N-alkyl morpholine, and N-alkyl imidazole.

8. The formulation of claim 4 where $R_4$ is methyl, ethyl, isopropyl, t-butyl, i-butyl, or n-butyl, and $R_1$, $R_2$, $R_3$ is represented by cyclic structures, aryl and/or aromatic, including pyridine, N-alkyl piperidine, N-alkyl pyrrolidine, N,N-dialkylated aniline, N,N'-alkylated piperazine, N-alkyl(1-phenylpiperazine), N,N,N',N'-tetraethyl hexamethylene diamine, and N-alkyl morpholine.

9. The formulation according to claim 4, further comprising N-alkylated tertiary amine, wherein N-alkylated tertiary amine comprises N-methyl derivatives of triethylamine, N-methylpiperidine, trimethylamine, tri(2-propyl)amine, and N-methylpyridine.

10. The formulation of claim 1 where the anion of the phase transfer catalyst is selected to be one or a combination of hydroxide ion; sulfate ion; chloride ion; nitrate ion; carbonate ion; orthophosphate ion including any combination of mono-, di- or tri-basic forms of the orthophosphate ion; other phosphates; phosphonates; phosphinates; acetate; any other oxidation resistant carboxylate including polycarboxylates; sulfonate; hexafluorophosphate; tetraphenyl borate ions; and trifluoroborate.

11. The formulation of claim 2, wherein the phase transfer catalyst is selected from a group consisting of organic quaternary ammonium and organic phosphonium compound, and wherein the organic portion of the phase transfer catalyst comprises an aliphatic or aryl hydrocarbon functional group, or a mixture thereof; having noninterfering functional groups selected from the group consisting of halides, alkoxy(R—O—), olefin, linear or branched.

12. The formulation of claim 1 in which an amount of the buffer is included such that the final pH after reaction of the ferrate is in the range 7-10.5.

13. The formulation of claim 1 in which the buffer is orthophosphate including any combination of mono-, di- or tri-basic forms of orthophosphate; polyphosphates; other phosphates; phosphonates; phosphinates; acetate; carbonate; bicarbonate; borate; borax; tetraborate; any other oxidation resistant carboxylate including polycarboxylates; sulfonate; hexafluorophosphate; tetraphenyl borate ions; and blends and mixtures thereof.

14. The formulation of claim 1 which also contains a non-oxidizable complexing compound.

15. The formulation of claim 1 which also contains a hygroscopic compound, wherein the hygroscopic compound comprises hygroscopic anhydrous and hydrated compounds of lithium, sodium, potassium, tetraammonium and other quaternary amine, salts of the anions: hydroxide, orthophosphate tribasic, nitrate, molybdate, periodate, perchlorate, acetate, perchlorate, carbonate, phosphate monobasic, phosphate dibasic, pyrophosphate, citrate, fluoride, disulfate, silicate, methane sulfonate, methyl sulfate, and/or oxide.

16. The formulation of claim 15, wherein the hygroscopic compound is deliquescent.

17. A method of using the formulation of claim 1 comprising the step of treating a hazardous or toxic material with the formulation of claim 1 or removing a contaminant from a material selected from crude oil; coal; natural gas; derivatives of crude oil, coal, or natural gas; and fuel by contacting with the formulation of claim 1.

18. The formulation of claim 14, wherein the complexing compound is etidronic acid, potassium fluoride, potassium bifluoride, and mono and/or polyphosphates.

19. The formulation of claim 1, wherein the pH is within a range of about 3 to about 12.

* * * * *